United States Patent [19]
Murata et al.

[11] Patent Number: 5,429,079
[45] Date of Patent: Jul. 4, 1995

[54] INTERNAL COMBUSTION ENGINE FOR VEHICLE

[75] Inventors: Shinichi Murata; Noriyuki Miyamura, both of Kyoto; Hirofumi Higashi, Kameoka; Setsuo Nishihara, Kyoto; Michiyasu Yoshida, Kyoto; Tetsuo Kataoka, Kyoto; Nobuaki Murakami, Kyoto; Hiroshi Kamada, Uji; Hideki Miyamoto, Nagoya, all of Japan

[73] Assignee: Mitsubishi Jidosha Kogyo Kabushiki Kaisha, Tokyo, Japan

[21] Appl. No.: 91,052

[22] Filed: Jul. 14, 1993

[30] Foreign Application Priority Data

| Jul. 16, 1992 | [JP] | Japan | 4-189711 |
| Jul. 16, 1992 | [JP] | Japan | 4-189712 |
| Jul. 16, 1992 | [JP] | Japan | 4-189713 |
| Jul. 30, 1992 | [JP] | Japan | 4-203958 |

[51] Int. Cl.6 .................................. F01L 1/34
[52] U.S. Cl. .................. 123/90.16; 123/54.4; 60/323
[58] Field of Search ............ 123/90.15, 90.16, 90.17, 123/90.27, 90.31, 54.4, 54.5, 54.6, 54.7, 54.8; 60/323

[56] References Cited

U.S. PATENT DOCUMENTS

| 4,869,214 | 9/1989 | Inoue et al. | 123/90.16 |
| 4,887,563 | 12/1989 | Ishida et al. | 123/90.16 |
| 5,181,485 | 1/1993 | Hirose et al. | 123/90.17 |
| 5,184,581 | 2/1993 | Aoyama et al. | 123/90.15 |
| 5,320,082 | 6/1994 | Murata et al. | 123/90.16 |

FOREIGN PATENT DOCUMENTS

| 0026249 | 4/1981 | European Pat. Off. |
| 0037269 | 10/1981 | European Pat. Off. |
| 2199079 | 6/1988 | United Kingdom |

OTHER PUBLICATIONS

Revue Technique Automobile, vol. 43, No. 498, Dec. 1, 1988, pp. 7–8, Renault 25 V6 Injection Turbo Limosine.
Revue Automobile Suisse, vol. 86, No. 21, 16 May 1991, Berne CH, pp. 27–29, Von Fersen "Le Six cylindres de la Honda NSX".

*Primary Examiner*—Henry C. Yuen
*Assistant Examiner*—Weilun Lo

[57] ABSTRACT

An internal combustion engine of the present invention comprises at least first and second cylinder banks each including a plurality of cylinders or a single cylinder, a first valve operating mechanism provided for each of the cylinders of the first cylinder bank for operating an intake valve or an exhaust valve of the cylinder to open and close, and a second valve operating mechanism having a valve operating characteristic different from that of the first valve operating mechanism and provided for each of the cylinders of the second cylinder bank for operating an intake valve or an exhaust valve of the cylinder to open and close.

9 Claims, 30 Drawing Sheets

FIG. I(A)      FIG. I(B)
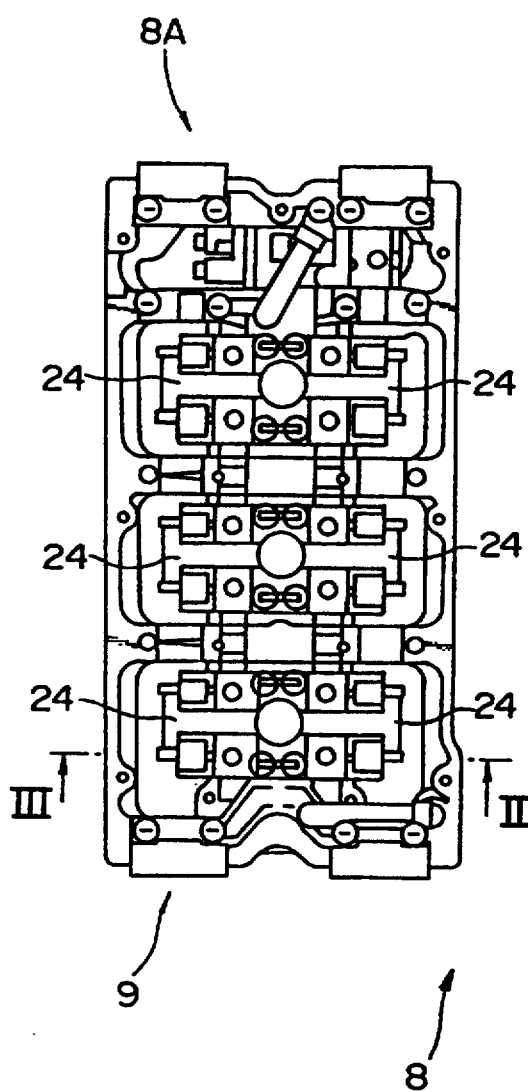
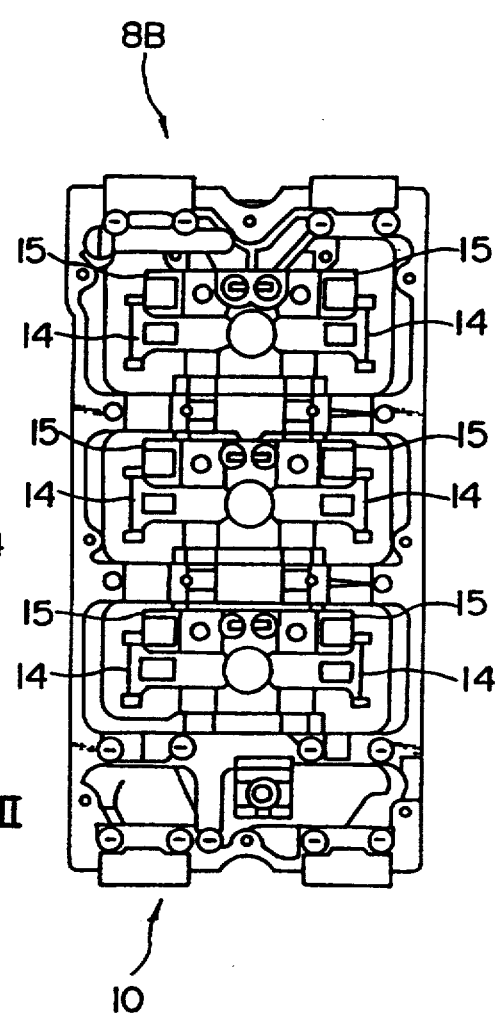

INTERNAL COMBUSTION ENGINE FOR VEHICLE

BACKGROUND OF THE INVENTION 1) Field of the Invention

This invention relates to the structure of an internal combustion engine having a plurality of cylinder banks, and more particularly to the structure of an internal combustion engine for a vehicle suitable for use as an internal combustion engine of the V-shaped arrangement (V-type engine). 2) Description of the Related Art In recent years, an apparatus for an OHC (overhead camshaft) engine for use with an automobile or a like vehicle has been developed wherein a valve operating system for operating an intake valve or an exhaust valve is operated to vary the operating timing or the lift amount (which will be hereinafter referred to generally as valve timing) of the intake or exhaust valve.

In the apparatus of the type described above, for example, a cam for a high speed and another cam for a low speed are provided on a camshaft and selectively used to obtain an operation timing of the intake or exhaust valve in accordance with an operating condition of the engine.

The high speed cam has a cam profile which can provide an operation timing suitable for high speed operation, and the low speed cam has another cam profile which can provide an operation timing suitable for low speed operation.

In a cam apparatus of the rocker arm type, the selection mechanism between the high speed cam and the low speed cam is constructed such that a pair of rocker arms are selectively connected to or disconnected from each other so that the valve is operated alternatively by the high speed cam or the low speed cam in order to obtain an operation timing of the intake or exhaust valve in accordance with an operation condition of the engine.

FIGS. 31 to 33 show an exemplary one of conventional valve operating systems (variable valve timing mechanisms) for selectively operating a high speed cam and a low speed cam.

Referring first to FIG. 31, the valve operating system shown includes three cams 102, 103 and 202, a pair of valves 101 serving as operated members, and three rocker arms 104, 105 and 204 interposed between the cams 102, 103 and 202 and the valves 101, respectively, and serving as arm members.

Here, the cams 102 and 202 serve as low speed cams while the cam 103 serves as a high speed cam, and the rocker arms 104 and 204 serve as low speed rocker arms operated by the cams 102 and 202, respectively, while the rocker arm 105 serves as a high speed rocker arm operated by the cam 103.

The rocker arms 104, 105 and 204 are supported for pivotal motion on a rocker shaft 106 so that they are individually rocked around the rocker shaft 106 by cam lifts of the cams 102, 103 and 202, respectively.

The low speed rocker arms 104 and 204 and the high speed rocker arm 105 are connected to or disconnected from each other by way of a pair of pistons 107 and 108 and a stopper 109.

In particular, referring also to FIGS. 32 and 33, the pistons 107 and 108 and the stopper 109 are accommodated in cylinders 204a, 105a and 104a formed coaxially in the rocker arms 204, 105 and 104, respectively, while they contact serially with each other in this order. Oil passages 106a and 204b are formed in the rocker shaft 106 and the rocker arm 204, respectively, and when oil is supplied into a space at an end portion Of the cylinder 204a by way of the oil passages 106a and 204b, the pistons 107 and 108 and the stopper 109 are moved forwardly (leftwardly in FIGS. 32 and 33) to couple the low speed rocker arms 104 and 204 and the high speed rocker arm 105 to each other, but when the oil is discharged from the space, the pistons 107 and 108 and the stopper 109 are moved rearwardly (rightwardly in FIGS. 32 and 33) by a biasing force of a return spring 110 to cancel the coupling between the low speed rocker arms 104 and 204 and the high speed rocker arm 105. The high speed rocker arm 105 is normally biased upwardly by a return spring 111.

With the variable valve timing mechanism of the construction described above, when the engine operates at a low speed, oil is discharged from the space at the end portion of the cylinder 204a so that the pistons 107 and 108 and the stopper 109 are moved rightwardly in FIG. 32 by the return spring 110 until they are accommodated into the rocker arms 204, 105 and 104, respectively. Consequently, the high speed rocker arm 105 and the low speed rocker arms 104 and 204 are disconnected from each other.

As a result, the cam profile of the low speed cam 102 is rendered effective.

On the other hand, when the engine operates at a high speed, oil is supplied into the space at the end portion of the cylinder 204a as seen from FIG. 33 so that the pistons 107 and 108 and the stopper 109 are moved leftwardly in FIG. 33 by the pressure of the oil.

Consequently, the pistons 107 and 108 connect the low speed rocker arms 204 and 104 to the high speed rocker arm 105, respectively.

Since the cam lift of the high speed cam 103 is greater than the cam lift of the low speed cams 102 and 202, the low speed cams 102 and 202 are spaced from and do not operate the respective low speed rocker arms 104 and 204, and the variable valve timing mechanism operates only with the high speed cam 103.

Where the variable valve timing mechanism which can Vary the valve timing in this manner is employed for an engine of an automobile or a like vehicle, a valve timing suitable for an operation condition of the engine can be provided. Multi-cylinder engines have been realized which include a plurality of variable valve timing mechanisms of a same construction provided for individual cylinders and cause the variable valve timing mechanisms to operate similarly to each other across a certain operation condition of the engine (for example, the speed of rotation of or the load to the engine) to vary the performances of the valves.

Also multi-cylinder internal combustion engines (multi-cylinder engines) having a plurality of cylinder banks have been proposed which include means for differentiating the valve timings of the intake valves or the exhaust valves of the engine from each other among the different cylinders using a plurality of sets of valve operating mechanisms for variable valve timing mechanisms of the engine having different characteristics from each other to adjust the rotating condition of the engine finely to improve the output power or the fuel consumption of the engine.

FIGS. 34 and 35 show valve operating apparatus disclosed in Japanese Patent Laid-Open Application No. Heisei 3-57284. Particularly, FIG. 34 shows a valve operating apparatus for a four-cylinder engine. In the engine shown, valves 101 and 201 of first and fourth cylinders C1 and C4 are operated to be opened and closed each by a valve operating mechanism 40a including a variable valve timing mechanism while valves 101 and 201 of second and third cylinders C2 and C3 are operated to be opened and closed each by another valve operating mechanism 40b having another variable valve timing mechanism different from that of the valve operating mechanism 40a.

Each of the valve operating mechanisms 40a includes first and third rocker arms 41 and 43a which do not contact with any cam and a second rocker arm 42 which slidably contacts with a high speed cam 103. The first and third rocker arms 41 and 43a and the second rocker arm 42 are supported for pivotal motion on a rocker shaft 106 such that they can be connected to and disconnected from each other. The second rocker arm 42 is located between the first rocker arm 41 and the third rocker arm 43a. The valve 101 is operated by the first rocker arm 41 while the valve 201 is operated by the third rocker arm 43a. Change-over between connection and disconnection of the rocker arms 41, 42 and 43a is performed by forward and rearward movement, respectively, of piston pins not shown by a hydraulic pressure similarly as in the variable valve timing mechanism described above.

Meanwhile, each of the other valve operating mechanisms 40b includes a first rocker arm 41 which does not contact with any cam, a second rocker arm 42 which slidably contacts with a high speed cam 103, and a third rocker arm 43b for slidably contacting with a low speed cam 102. The first, second and third rocker arms 41, 42 and 43b are supported for pivotal motion on the rocker shaft 106 such that they can be connected to and disconnected from each other. The valve 101 is operated by the first rocker arm 41 while the valve 201 is operated by the third rocker arm 43b. Change-over between connection and disconnection of the rocker arms 41, 42 and 43b is performed by forward and rearward movement, respectively, of piston pins not shown by a hydraulic pressure similarly as in the variable valve timing mechanism described above.

In the engine of the construction described above, when the engine operates at a low speed, the rocker arms 41, 42 and 43a in each of the first and fourth cylinders C1 and C4 are disconnected from each other, and consequently, the valve 101 connected to the first rocker arm 41 and the valve 201 connected to the third rocker arm 43a are not operated and are held closed so that the first and fourth cylinders C1 and C4 are at rest or inoperative.

Meanwhile, also in each of the second and third cylinders C2 and C3, the rocker arms 41, 42 and 43b are disconnected from each other, and consequently, the valve 101 connected to the first rocker arm 41 is not operated and is held closed while the valve 201 connected to the third rocker arm 43b is operated to open and close at a valve timing in accordance with the profile of the low speed cam 102.

Accordingly, when the engine operates at a low speed, the first and fourth cylinders C1 and C4 of the total four cylinders are in a rest condition while the valves 201 of the remaining second and third cylinders C2 and C3 are operated to open and close in accordance with the low speed cams 102.

On the other hand, when the engine operates at a high speed, in each of the first and fourth cylinders C1 and C4, the rocker arms 41, 42 and 43a are connected to each other so that they are rocked integrally with each other, and consequently, the valves 101 and 201 are operated to open and close at a timing and by a lift amount provided by the profile of the high speed cam 103.

Also in each of the second and third cylinders C2 and C3, the rocker arms 41, 42 and 43b are connected to each other so that they are rocked integrally with each other, and consequently, the valves 101 and 201 are operated to open and close at a timing and by a lift amount provided by the profile of the high speed cam 103.

Accordingly, upon high speed operation of the engine, all of the four cylinders operate in an operating condition provided by the high speed cams 103, and consequently, the output power of the engine is increased.

It is to be noted that reference numeral 1 in FIG. 34 denotes a cylinder head.

Referring now to FIG. 35, there is a valve operating apparatus for a six-cylinder engine. In the engine shown, valves 101 and 201 of first and sixth cylinders C1 and C6 are each operated by a valve operating system 40d; valves 101 and 201 of second and fifth cylinders C2 and C5 are each operated by another valve operating system 40b; and valves 101 and 201 of third and fourth cylinders C3 and C4 are each operated by a valve operating mechanism 40c. Here, the valve operating mechanisms 40b, 40c and 40d are each provided with a variable valve timing mechanism. In this manner, the six-cylinder engine includes three sets of valve operating mechanisms incorporated therein, and the sixth cylinder is paired with the first cylinder; the fifth cylinder is paired with the second cylinder: and the fourth cylinder is paired with the third cylinder.

Each of the valve operating mechanisms 40d includes a first rocker arm 141 which slidably contacts with a low speed cam 102, a second rocker arm 142 which does not slidably contact with any cam but is connected to two valves 101 and 201, and a third rocker arm 43 which slidably contacts with a high speed cam 103. The first, second and third rocker arms 141, 142 and 43 are supported for pivotal motion on a rocker shaft 106 such that they can be connected to and disconnected from each other. The second rocker arm 142 is disposed between the first and third rocker arms 141 and 43. The first and second rocker arms 141 and 142 can be connected to each other by supply of oil of a comparatively low pressure, and when they are connected to each other, the second rocker arm 142 is rocked by and integrally with the first rocker arm 141. Meanwhile, the second and third rocker arms 142 and 43 can be connected to each other by supply of oil of a comparatively high pressure, and when they are connected to each other, the second rocker arm 142 is rocked by and integrally with the third rocker arm 43.

Meanwhile, each of the valve operating mechanisms 40b includes a first rocker arm 41 which does not slidably contact with any cam but is connected to a valve 101, a second rocker arm 42 which slidably contacts with a high speed cam 103 and a third rocker arm 43b which slidably contacts with a low speed cam 102 and is connected to another valve 201. The first, second and third rocker arms 41, 42 and 43b are supported for pivotal motion on the rocker shaft 106 such that they can be connected to and disconnected from each other. Accordingly, the two valves 101 and 201 are individually connected for interlocking motion to the first and third rocker arms 41 and 43b, respectively.

On the other hand, each of the valve operating mechanisms 40c includes first, second and third rocker arms 41, 42 and 43b disposed in a similar manner as in the valve operating mechanisms 40b. But here, the first and second rocker arms 41 and 42 are connected to each other by supply of oil of a comparatively low pressure, and the second and third rocker arms 42 and 43b are connected to each other by supply of oil of a comparative high pressure.

Accordingly, when the engine operates at a low speed, the first, second and third rocker arms 141, 142 and 43 of each of the first and sixth cylinders C1 and C6 are disconnected from each other, and consequently, the second rocker arm 142 to which the two valves 101 and 201 are connected is not rocked. As a result, the first and sixth cylinders C1 and C6 are at rest.

Also in each of the second and fifth cylinders C2 and C5, the first, second and third rocker arms 41, 42 and 43b are disconnected from each other, and consequently, the valve 101 to which the first rocker arm 41 is connected is at rest while the valve 201 connected to the third rocker arm 43b is operated to open and close at a timing and by a lift amount provided by the profile of the low speed cam 102.

Also in each of the third and fourth cylinders C3 and C4, the first, second and third rocker arms 41, 42 and 43b are disconnected from each other, and consequently, the valve 101 connected to the first rocker arm 41 is at rest while the valve 201 connected to the third rocker arm 43b is operated to open and close at a timing and by a lift amount provided by the profile of the low speed cam 102.

When the engine operates at an intermediate speed, the first and second rocker arms 141 and 142 in each of the valve operating mechanisms 40d and the first and second rocker arms 41 and 42 in each of the valve operating mechanisms 40c are individually connected to each other.

Accordingly, in each of the first and sixth cylinders C1 and C6, the two valves 101 and 201 connected to the second rocker arm 142 are operated to open and close at a timing and by a lift amount provided by the profile of the low speed cam 102.

Meanwhile, in the second and fifth cylinders C2 and C5, the connecting conditions of the rocker arms 41, 42 and 43b in each of the valve operating mechanisms 40b are the same as those when the engine operates at a low speed. Thus, the valve 101 connected to the first rocker arm 41 is at rest while the valve 201 connected to the third rocker arm 43b is operated to open and close at a timing and by a lift amount provided by the profile of the low speed cam 102.

Further, in each of the third and fourth cylinders C3 and C4, the first and second rocker arms 41 and 42 in each of the valve operating mechanisms 40c are connected to each other, and consequently, the valve 101 connected to the first rocker arm 41 is operated to open and close at a timing and by a lift amount provided by the profile of the high speed cam 103 while the valve 201 connected to the third rocker arm 43b is operated to open and close at a timing and by a lift amount provided by the profile of the low speed cam 102.

When the engine operates at a high speed, the rocker arms 141, 142 and 43 of each of the valve operating mechanisms 40d are connected to each other, and also the rocker arms 41, 42 and 43b of each of the valve operating mechanisms 40b are connected to each other. Also the rocker arms 41, 42 and 43b in each of the valve operating mechanism 40c are connected to each other.

Accordingly, the valves 101 and 201 of all of the cylinders C1 to C6 are each operated to open and close at a timing and by a lift amount provided by the high speed cam 103.

In particular, in the first and sixth cylinders C1 and C6, the second rocker arm 142 is rocked by and integral with the third rocker arm 43, and consequently, the two valves 101 and 201 connected to the second rocker arm 142 are operated to open and close at a timing and by an amount provided by the profile of the high speed cam 103.

Meanwhile, in the second and fifth cylinders C2 and C5, the rocker arms 41, 42 and 43b are rocked by and integral with the high speed cam 103, and consequently, the valves 101 and 201 connected to the first and third rocker arms 41 and 43b are operated to open and close at a timing and by an amount provided by the profile of the high speed cam 103.

Further, also in the third and fourth cylinders C3 and C4, similarly as in the second and fifth cylinders C2 and C5, the rocker arms 41, 42 and 43b are rocked by and integral with the high speed cam 103, and consequently, the valves 101 and 201 connected to the first and third rocker arms 41 and 43b are operated to open and close at a timing and by a lift amount provided by the profile of the high speed cam 103.

It is to be noted that those mechanisms are applied to both of the intake valves and the exhaust valves.

By incorporating a plurality of sets of different valve operating mechanisms for different cylinders in this manner, each of the valve operating mechanisms can vary valve timings of an intake valve and an exhaust valve in response to the speed of rotation of and/or the load to the engine and can cause intake valves or exhaust valves of a certain set of cylinders (for example, the set of the first and sixth cylinders in the case of the engine described above) to operate at valve timings different from those of intake valves or exhaust valves of the other sets of cylinders under a certain condition of the engine.

Accordingly, by varying the operation forms of the intake valves or exhaust valves of the different cylinders in response to an operation condition of the engine, the output power of the engine is controlled finely and the fuel consumption is improved.

Meanwhile, it is also possible to apply the structure, wherein a plurality of types of valve operating systems is assembled on a single engine in this manner, to an engine of the type having a plurality 10 of cylinder banks such as, for example, a V-type engine.

In this manner, in an engine of the type which includes a plurality of cylinder banks, the arrangement, the combination and so forth of valve operating systems have an influence upon various aspects of the automobile such as, for example, the facility of assembly of the engine described above, maintenance and so forth of the engine and the performance of a catalyzer for exhaust gas purification provided for the engine. Also subjects peculiar to an engine having a plurality of cylinder banks are provided with regard to the intake system and the exhaust system.

In particular, the conventional valve operating mechanism described above is complicated in structure. Besides, where different valve operating mechanisms of the conventional structure are incorporated in different cylinders of a multi-cylinder engine, there are a problem to be solved that, upon assembly of the engine, an operator may possibly assemble parts in error and another problem that a long period of time is required for assembly of the engine and the production efficiency is low.

In this connection, it is considered that a unique solution or solutions be available with an engine having a plurality of cylinder banks.

Further, in an engine, for example, in a V-type engine, it is necessary to assure a certain length for an intake pipe. To this end, it seems a promising means to dispose part of the intake pipe in an overhanging condition above the cylinder head.

However, it is considered that, in a V-type engine provided with a variable displacement mechanism, a cylinder block for a cylinder provided with a variable displacement mechanism is complicated in structure and high in frequency for maintenance compared with another cylinder block for another cylinder provided with no variable displacement mechanism. Therefore, if intake pipes are disposed in an overhanging condition above the cylinder blocks of a V-type engine as described above, then there is a subject that the facility of maintenance of the cylinder blocks of cylinders each provided with such a variable displacement mechanism as described above is deteriorated by the intake valves.

Further, where the intake valves partially overhang above the cylinder head as described above, there is another subject that, when it is tried to adjust the valve clearances, for example, at cylinder head portions located below the intake valves, the intake pipes may disturb such operation, and consequently, it is difficult to perform management of the valve clearances.

Further, a vehicle such as an automobile normally includes a catalytic converter installed thereon for purifying exhaust gas exhausted from the engine. Such catalytic converter is normally provided on a route of exhaust gas extending from the engine to the muffler (silencer) and includes a purifying catalyzer for reducing the concentration of CO (carbon oxide), HC (hydrocarbon), NOx (nitrogen oxides) and like chemicals contained in the exhaust gas.

FIG. 36 shows the relationship between the purifying efficiency of a catalytic converter and the temperature of exhaust gas. As seen from FIG. 36, the purifying efficiency of the catalytic converter is higher when the temperature of the exhaust gas is high, and when the temperature of the exhaust gas is low, the exhaust gas is not purified efficiently. Accordingly, the catalytic converter is installed, in the exhaust gas route, at a location in the proximity of an exhaust manifold in which the temperature of the exhaust gas is comparatively high.

Meanwhile, an engine provided on a vehicle is popularly cooled by cooling wind such as running wind, and a cylinder which is blown directly by cooling wind is cooled to a large extent. Therefore, when some of cylinders of an engine provided with a variable displacement mechanism are rendered inoperative, the temperature of exhaust gas is lowered by running wind and/or cooling wind produced by a radiator cooling fan, resulting in deterioration of the purifying efficiency of the catalytic converter. Consequently, there is a problem that purification of exhaust gas cannot be performed sufficiently.

SUMMARY OF THE INVENTION

It is an object of the present invention to provide a multi-cylinder internal combustion engine having two cylinder banks wherein a structure which incorporates a plurality of different types of valve operating mechanisms can be realized while enhancing the facility in assembling operation and the production efficiency.

It is another object of the present invention to provide an internal combustion engine having a plurality of cylinder banks such as a V-type engine wherein the facility of maintenance of cylinder blocks can be assured such that the management of the valve clearances at cylinder heads can be performed sufficiently while assuring necessary lengths for intake pipes of the engine.

It is a further object of the present invention to provide an internal combustion engine wherein exhaust gas can be purified sufficiently without deteriorating the purifying efficiency of a catalytic converter even when some of cylinders of the engine are rendered inoperative during operation of the engine.

In order to attain the objects described above, according to an aspect of the present invention, there is provided an internal combustion engine for a vehicle, which comprises a first cylinder bank and a second cylinder bank each including a plurality of cylinders or a single cylinder, a first valve operating mechanism provided for each of the cylinders of the first cylinder bank for operating an intake valve or an exhaust valve of the cylinder to open and close, and a second valve operating mechanism having a valve operating characteristic different from that of the first valve operating mechanism and provided for each of the cylinders of the second cylinder bank for operating an intake valve or an exhaust valve of the cylinder to open and close.

Preferably, the first valve operating mechanism is a valve operating mechanism of the variable valve timing type with a variable displacement mechanism, and the second valve operating mechanism is another valve operating mechanism of the variable valve timing type with no variable displacement mechanism.

The first and second cylinder banks may be combined such that they are inclined relative to each other so as to construct the internal combustion engine as an internal combustion engine of the V-type arrangement.

According to another aspect of the present invention, there is provided an internal combustion engine for a vehicle, which comprises a first cylinder bank and a second cylinder bank each including a plurality of cylinders or a single cylinder, an intake system disposed in a partially overhanging condition above the first cylinder bank in order to assure a required length for an intake passage of the intake system, a valve operating system provided for each of the cylinders of the first and second cylinder banks for operating a valve of the cylinder, and a hydraulic lash adjuster provided for each of the valve operating systems for the cylinders of the first cylinder bank for automatically adjusting the valve clearance of the valve operating system from the valve of the cylinder.

The first and second cylinder banks may be combined such that they are inclined relative to each other so as to construct the internal combustion engine as an internal combustion engine of the V-type arrangement. In this instance, preferably the internal combustion engine for a vehicle further comprises a variable displacement mechanism provided for each of the cylinders of the second cylinder bank. Preferably, each of the valve operating systems provided for the cylinders of the first cylinder bank is a valve operating system of the variable valve timing type with no variable displacement mechanism, and each of the valve operating systems provided for the cylinders of the second cylinder bank is a valve operating system of the variable valve timing type with a variable displacement mechanism.

According to a further aspect of the present invention, there is provided an internal combustion engine for a vehicle, which comprises a first cylinder bank and a second cylinder bank each including a plurality of cylinders of a single cylinder, an intake system disposed in a partially overhanging condition above the first cylinder bank in order to assure a required length for an intake passage of the intake system, and a variable displacement mechanism provided for each of the cylinders of the second cylinder bank.

The first and second cylinder banks may be combined such that they are inclined relative to each other so as to construct the internal combustion engine as an internal combustion engine of the V-type arrangement. Preferably, the internal combustion engine for a vehicle further comprises a first valve operating system of the variable valve timing type with no variable displacement mechanism provided for each of the cylinders of the first cylinder bank, and a second valve operating system of the variable valve timing type with a variable displacement mechanism provided for each of the cylinders of the second cylinder bank.

According to a still further aspect of the present invention, there is provided an internal combustion engine for a vehicle, which comprises a first cylinder bank and a second cylinder bank each including a plurality of cylinders of a single cylinder, a purifying catalyzer for purifying exhaust gas from the internal combustion engine, and a variable displacement mechanism provided for each of the cylinders of the second cylinder bank for rendering the cylinder inoperative, the second cylinder bank being disposed on the upstream side of cooling wind blown to the internal combustion engine so that, when the cylinders of the second cylinder bank are rendered inoperative by the variable displacement mechanisms, the drop of the temperature of exhaust gas to flow into the purifying catalyzer is controlled so as to maintain the purifying performance of the purifying catalyzer.

Preferably, the internal combustion engine is installed transversely at a front portion of the vehicle such that the first and second cylinder banks are directed transversely to the vehicle, and the cylinders to be rendered inoperative by the variable displacement mechanisms are set on the front side of the vehicle so as to be blown by cooling wind when the vehicle runs.

BRIEF DESCRIPTION OF THE DRAWINGS

FIGS. 1(A) and 1(B) are schematic views showing an internal combustion engine for a vehicle according to a first preferred embodiment of the present invention, FIG. 1(A) being a view as viewed in the direction of an arrow mark M in FIG. 2 while FIG. 1(B) is a view as viewed in the direction of another arrow mark N in FIG. 2;

FIG. 28(A) being a view as viewed in the direction of an arrow mark M in FIG. 2 while FIG. 28(B) is a view as viewed in the direction of another arrow mark N in FIG. 2;

DETAILED DESCRIPTION OF THE INVENTION AND THE PREFERRED EMBODIMENTS

Figure 2:
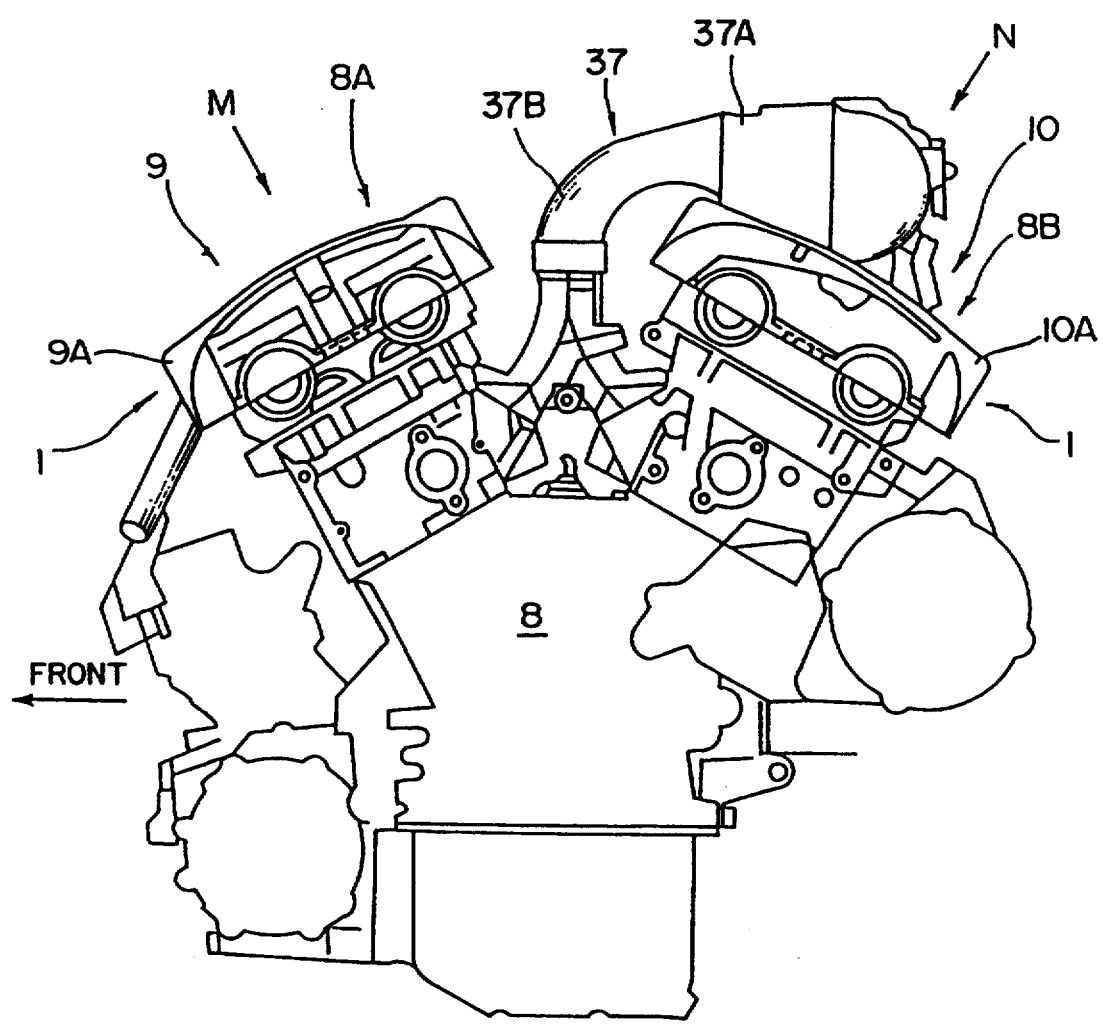
FIG. 2 is a schematic view showing the internal combustion engine of FIGS. 1(A) and 1(B) in an installed condition as viewed from a side of a vehicle on which the internal combustion engine is installed.

Referring first to FIGS. 1(A), 1(B) and 2, there is shown an internal combustion engine of the V-type arrangement, that is, a V-type engine, placed transversely on a vehicle. The V-type engine shown is generally denoted at 8 and includes a valve operating mechanism provided for each of the cylinders thereof for operating an intake valve and an exhaust valve. The V-type engine 8 has two cylinder banks 8A and 8B shown in FIGS. 1(A) and 1(B), respectively, and valve operating systems of different types are provided for the cylinder banks 8A and 8B.

In particular, the cylinder bank 8A of the engine 8 shown in FIG. 1(A) and on the left side in FIG. 2 is located on the front side of the vehicle and includes, for a valve operating mechanism 9 for each cylinder, a variable valve timing mechanism with a variable displacement mechanism which will be hereinafter described. Meanwhile, the other cylinder bank 8B of the engine 8 shown in FIG. 1(B) and on the right side in FIG. 2 is located on the rear side of the vehicle and includes, for a valve operating mechanism 10 for each cylinder, a variable valve timing mechanism with no variable displacement mechanism which will also be hereinafter described. The valve operating mechanisms 9 and 10 are covered with rocker covers 9A and 10A, respectively.

Referring particularly to FIG. 2, the engine 8 includes an intake system 37 by which intake air is taken into each cylinder from the valley side between the two cylinder banks 8A and 8B. In particular, intake air is taken into the individual cylinders from a surge tank 37A by way of an intake pipe 37B.

The surge tank 37A is located above the cylinder bank 8B on the rear side of the vehicle, and the intake pipe 37B on one hand is connected to intake ports 37C of the cylinder banks 8A and 8b and on the other hand is bent in the rearward direction of the vehicle above the engine 8 and connected to the surge tank 37A.

Accordingly, the intake system 37 including the surge tank 37A and the intake pipe 37B are disposed in an overhanging condition above the engine 8, and the surge tank 37A is located above a cylinder head 1 of the cylinder bank 8B on the rear side of the vehicle for which the variable valve timing mechanisms with no variable displacement mechanism are provided.

Figure 3:
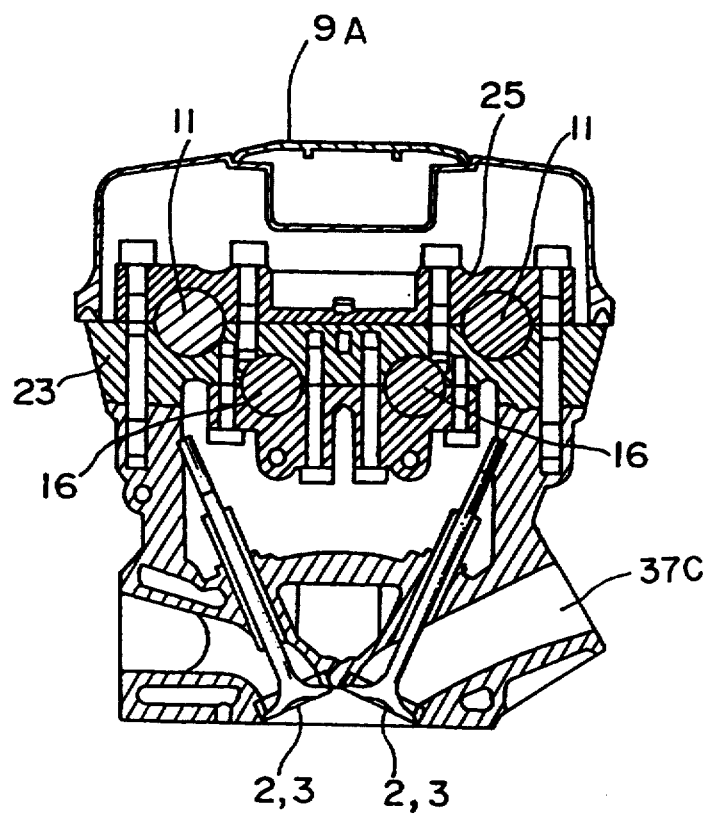
FIG. 3 is a sectional view taken along line III—III of FIG. 1(A)

As can be seen from FIGS. 2 and 3, the valve operating mechanisms 9 and 10 of the V-type engine 8 can be checked and maintained if the rocker covers 9A and 10A are removed from the cylinder heads 1, respectively.

Figure 4:
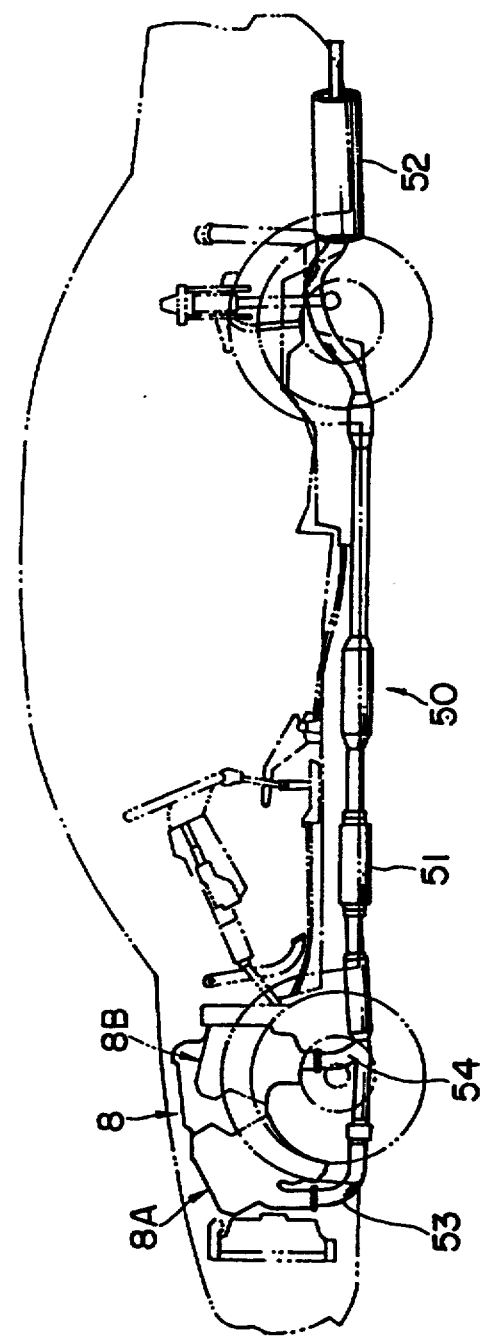
FIG. 4 is a schematic side elevational view showing the entire vehicle on which the internal combustion engine is installed.
Figure 5:
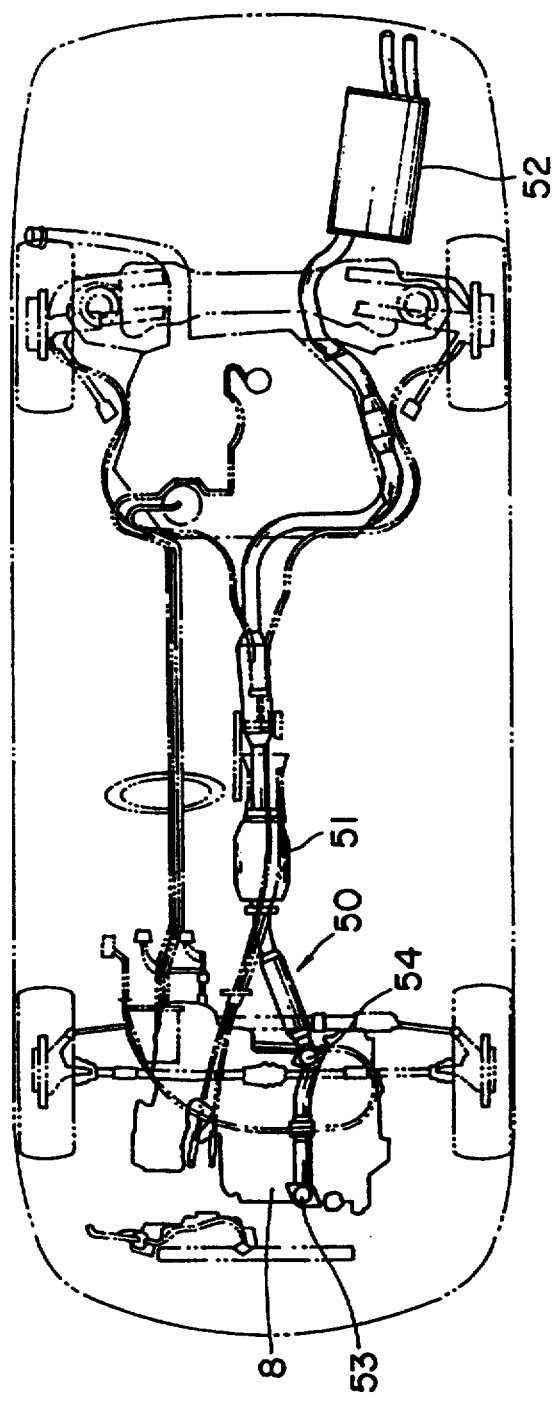
FIG. 5 is a schematic top plan view showing the entire vehicle shown in FIG. 4.

Referring to FIGS. 4 and 5, the vehicle includes a catalytic converter 51 for purifying exhaust gas exhausted from the engine 8. The catalytic converter 51 is provided on an exhaust gas passageway 50 extending from the cylinders of the engine 8 to a muffler or silencer 52 and reduces the concentrations of CO, HC, NOx and so forth in the exhaust gas. The exhaust gas purified by the catalytic converter 51 is exhausted into the atmospheric air by way of the muffler 52 installed at a rear portion of the vehicle.

Further, two exhaust manifolds 53 and 54 are provided on the exhaust gas passageway 50 on the upstream side of the catalytic converter 51. Front ends of the exhaust manifolds 53 and 54 are connected to exhaust ports of the cylinder banks 8A and 8B in the cylinder heads 1, and Fear ends of the exhaust manifolds 53 and 54 join each other and connect to the catalytic converter 51.

The exhaust manifold 53 is disposed forwardly of the engine 8 so that it is always exposed to running wind during running of the vehicle. Meanwhile, the other exhaust manifold 54 is disposed rearwardly of the engine 8 so that it is not blown very much by running wind.

Figure 6A:
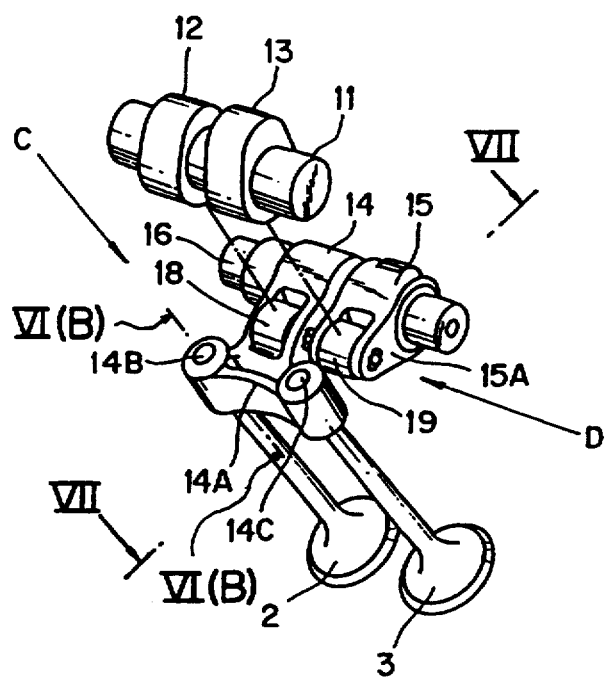
FIG. 6(A) is a perspective view showing part of a valve operating system structure with a variable valve timing mechanism having no variable displacement mechanism in the internal combustion engine of FIGS. 1(A) and 1(B) with cams shown spaced away from rocker arms.

Here, the valve operating system structures 10 with no variable displacement mechanism will be described. Referring to FIG. 6(A), each of the valve operating systems 10 is provided for a pair of intake valves or exhaust valves (hereinafter referred to merely as valves)

and is constructed to operate the valves 2 and 3 to open and close.

The valve operating system 10 includes a pair of cams 12 and 13 which rotate upon rotation of a crankshaft (not shown) of the engine 8, and a pair of rocker arms 14 and 15 which are operated by the cams 12 and 13, respectively.

Figure 23:
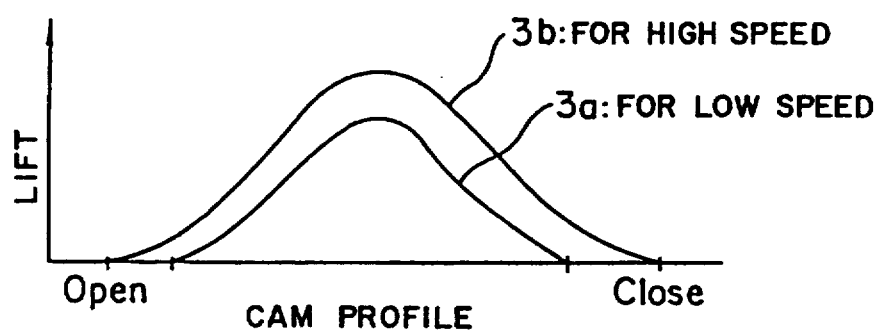
FIG. 23 is a diagram showing cam profiles of the valve operating system structure with a variable valve timing mechanism shown in FIG. 6(A)

The cams 12 and 13 are mounted on a camshaft 11 which rotates by rotation of the crankshaft of the engine 8, and the cam 12 serves as a cam for a low speed having a cam profile for a valve timing upon rotation of the engine at a low speed while the cam 13 serves as another cam for a high speed having a cam profile for a valve timing upon rotation of the engine at a high speed. The low speed cam 12 and the high speed cam 13 have such cam profiles 3a and 3b as shown in FIG. 23. As seen from FIG. 23, the cam profile 3b of the high speed cam 13 is set so as to include the cam profile 3a of the low speed cam 12.

The rocker arms 14 and 15 are each in the form of a rocker arm with a roller, and the rocker arm 14 serves as a main rocker arm adapted to be contacted directly with the valves 2 and 3 to operate the valves 2 and 3 to open and close while the rocker arm 15 serves as a sub-rocker arm which indirectly operates the valves 2 and 3 to open and close.

Figure 7:
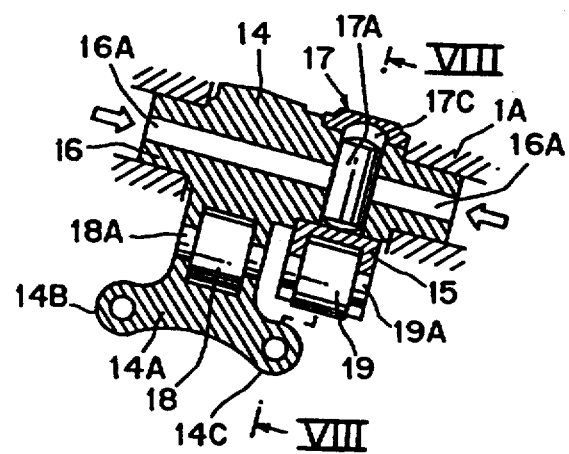
FIG. 7 is a sectional view taken along line VII—VII of FIG. 6(A)

Referring to FIG. 7, the main rocker arm 14 has a rocker shaft 16 formed integrally thereon. The rocker shaft 16 is disposed in parallel to the axis of the cam shaft 11 between a cam holder 23 provided at the top of the cylinder head 1 and a cap 25 provided so as to cover over the cam holder 23 as shown in FIG. 3. The rocker shaft 16 is supported for rotation at a bearing portion 1A provided on the cylinder head 1 or a like element of the engine 8 so that the main rocker arm 14 can be pivoted around the axis of the rocker shaft 16.

A pair of mounting holes 14B and 14C are formed at a rocking end portion 14A of the main rocker arm 14, and a pair of hydraulic lash adjusters (HLAs) 81 are mounted in the mounting holes 14B and 14C for contacting with ends of the stems of the valves 2 and 3, respectively.

Referring to FIGS. 6(A), 7, 11 and 13, a roller 18 for a low speed is mounted at an intermediate portion of the main rocker arm 14 for engaging the low speed cam 12. The low speed roller 18 is supported for smooth rotation by means of a roller bearing 18B on a shaft 18A supported for rotation at an intermediate portion of the main rocker arm 14.

Figure 14:
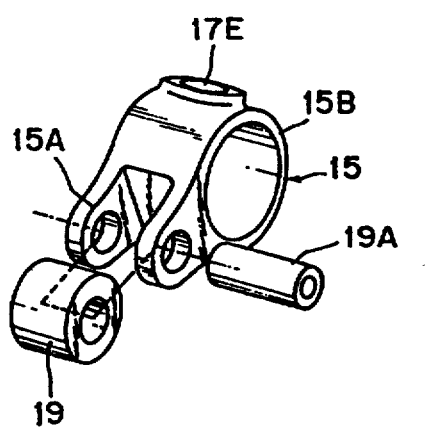
FIG. 14 is an exploded perspective view of the rocker arm shown in FIG. 11.

Meanwhile, referring to FIGS. 7 and 14, the sub-rocker arm 15 is supported at a tubular base portion 15B thereof for pivotal motion on the rocker shaft 16, that is, on the main rocker arm 14, and a roller 19 for a high speed is mounted at a rocking end portion 15A of the sub-rocker arm 15 for contacting with the high speed cam 13. Also the high speed roller 19 is supported for smooth rotation by means of a roller bearing 19B (FIG. 8) on a shaft 19A supported for rotation at the rocking end portion 15A of the sub-rocker arm 15.

A hydraulic piston mechanism 17 is provided between the sub-rocker arm 15 and the rocker shaft 16 and serves as mode change-over means for changing over the operation mode of the sub-rocker arm 15 between a non-interlocking mode in which the sub-rocker arm 15 is pivotable with respect to the rocker shaft 16 and does not operate in an interlocking relationship with the main rocker arm 14 and another interlocking mode in which the sub-rocker arm 15 pivots integrally with the rocker shaft 16 and operates in an interlocking relationship with the main rocker arm 14.

Figure 8:
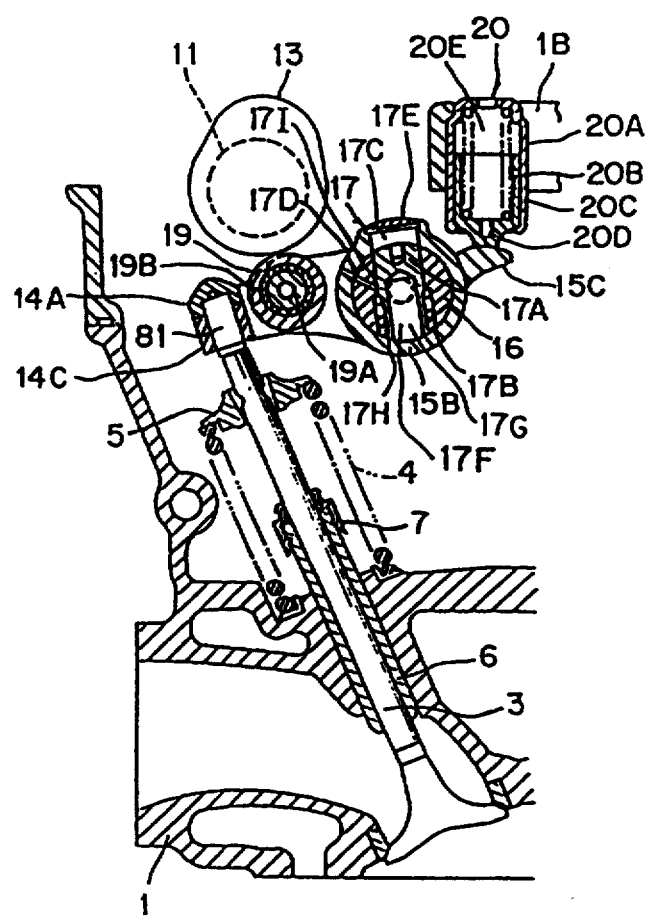
FIG. 8 is a sectional view taken along line VIII—VIII of FIG. 7 (also see line VIII—VIII of FIG. 11)

Referring also to FIG. 8, the hydraulic piston mechanism 17 serving as mode change-over means includes a piston 17A disposed for movement in a diametrical direction of the rocker shaft 16 in a piston chamber formed in the rocker shaft 16. The piston 17A has a recess 17F formed at an axial portion adjacent a lower or base end side thereof in FIGS. 7 and 8, and a hydraulic chamber 17G is defined between the recess 17F of the piston 17A and an inner circumferential face of the tubular base portion 15B of the sub rocker arm 15.

A flange portion 17H is formed on an outer periphery of the base end of the piston 17A while a stepped portion 17I is formed on the inner wall of the piston chamber, and a coil spring 17B is fitted in a compressed condition between the flange portion 17H and the stepped portion 17I. Accordingly, the piston 17A is normally biased toward the base end portion thereof by the spring 17B.

A hole 17C is formed at a portion of the tubular base portion 15B of the sub-rocker arm 15 such that the other end of the piston 17A, that is, the upper end in FIGS. 7 and 8, can be fitted into it.

Figure 9:
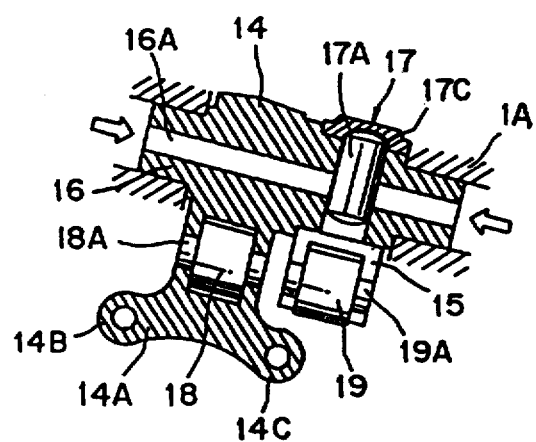
FIG. 9 is a sectional view similar to FIG. 7 but illustrating operation of the valve operating system structure with a variable valve timing mechanism.

Operating oil is introduced into the hydraulic chamber 17G by way of an oil passage 16A formed in the rocker shaft 16 along the axis. When operating oil is supplied into the hydraulic chamber 17G, the piston 17A is operated toward its upper end side in FIGS. 7 and 8 against the biasing force of the spring 17B so that the end portion thereof is fitted into the hole 17C as seen in FIG. 9. Meanwhile, if supply of operating oil into the hydraulic chamber 17G is interrupted, then the piston 17A is moved reversely toward its base end side by the biasing force of the spring 17B so that the upper end thereof in FIG. 9 is removed from within the hole 17C.

In short, when operating oil is supplied into the hydraulic chamber 17G, the upper end portion of the piston 17A in FIG. 9 is fitted into the hole 17C as seen in FIG. 9 to put the sub-rocker arm 15 into the interlocking mode in which the sub-rocker arm 1B rotates integrally with the rocker shaft 16 and operates in an interlocking relationship with the main rocker arm 14, but when supply of operating oil into the hydraulic chamber 17G is interrupted, the upper end portion of the piston 17A in FIG. 9 is removed from the hole 17C to put the sub-rocker arm 15 back into the non-interlocking mode in which the sub-rocker arm 15 is pivotable relative to the rocker shaft 16 and does not operate in an interlocking relationship with the main rocker arm 14.

A check ball 17J is located in the interior of the recess 17F so that the oil pressure in the hydraulic chamber 17G may be maintained. Meanwhile, an oil hole 17D is formed in the rocker shaft 16 and the tubular base portion 15B of the sub-rocker arm 15 for allowing part of operating oil in the hydraulic chamber 17G to leak to the outside to adjust the pressure of the operating oil within a predetermined range.

Figure 26B:
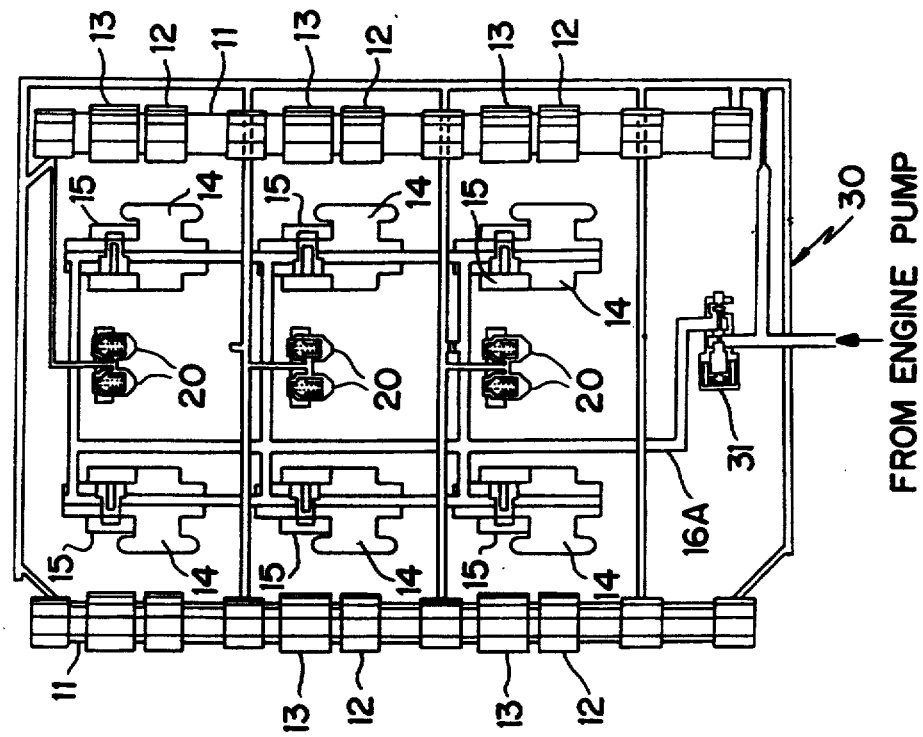
FIG. 26(A) is a schematic circuit diagram showing a hydraulic circuit of the valve operating system of FIG. 1(A) and FIG. 26(B) is a similar view but showing another hydraulic circuit of the valve operating system of FIG. 1(B)

Operating oil is supplied into the hydraulic chamber 17G by means of an operating oil supply system not shown. The operating oil supply system includes an engine pump (not shown) in the form of a hydraulic pump connected to be driven by the engine 8 or a like apparatus, pressure regulating means (not shown) for regulating operating oil pressurized by the engine pump to a predetermined hydraulic pressure, and a cut-off popper valve 31 shown in FIG. 26(B). The cut-off poppet valve 31 acts to change over between a supplying condition wherein operating oil of a pressure regulated by the pressure regulating means is supplied into the hydraulic chamber 17G by way of the oil passage 16A and another non-supplying condition wherein the operating oil is not supplied into the hydraulic chamber 17G. The cut-off poppet valve 31 in the arrangement shown is constituted from a solenoid valve which can be electronically controlled by means of a controller 34 which will be hereinafter described. The sub-rocker arm 15 can thus be changed over appropriately between the interlocking mode and the non-interlocking mode while the cut-off poppet valve 31 is controlled in response to the speed of rotation of the engine or some other parameter.

Referring now to FIG. 8, a spring retainer 5 is provided adjacent an upper end of the valve stem 6 of the valve 3 while another spring retainer 7 is provided on the cylinder head 1, and a valve spring 4 is disposed between the two spring retainers 5 and 7 so that the valve 3 is normally biased in its closing direction, that is, toward the upper end side of the valve stem 6. Accordingly, also the main rocker arm 14 is normally biased toward the cam 12 side by the valve spring 4, and the biasing force of the valve spring 4 acts as a returning force for the main rocker arm 14 upon rocking motion.

On the other hand, the sub-rocker arm 15 is integrated, when in the interlocking mode, with the main rocker arm 14 and acted upon by the biasing force of the valve spring 4, but when in the non-interlocking mode, the sub-rocker arm 15 is not acted upon by the biasing force. Accordingly, means for biasing the sub-rocker arm 15 toward the cam 13 side must necessarily be provided so that the sub-rocker arm 15 may follow up the cam 13. To this end, a lost motion mechanism 20 is provided for the sub-rocker arm 15.

Referring to FIG. 8, the lost motion mechanism 20 includes a lost motion holder 1B provided on the cylinder head 1 or a like element, an outer case 20A secured to the lost motion holder 1B, an inner case 20B mounted for back and forth movement in the outer case 20A such that it may not be removed from the outer case 20A, a spring 20C interposed between the outer case 20A and the inner case 20B, and a contacting portion 20D formed at an end portion of the inner case 20B. A lever portion 15C is provided on the sub-rocker arm 15 and contacts with the contacting portion 20D of the lost motion mechanism 20, and the sub-rocker arm 15 is resiliently pressed against the cam 13 by the biasing force of the spring 20C of the lost motion mechanism 20 to perform a predetermined operation in response to the cam 13.

It is to be noted that the spring force of the lost motion spring 20C is set so as to stand a force of inertia acting upon the sub-rocker arm 15. In particular, when the inertial force acting upon the sub-rocker arm 15 is such as indicated by the curve a2 in FIG. 10, the spring force of the lost motion spring 20C can be set to such a low level as indicated, for example, by the Curve b2 in FIG. 10 corresponding to the inertial force.

Further, in the present valve operating system 10, the low speed roller 18 is made of a material lighter in weight than that of the high speed roller 19. In short, while the high speed roller 19 is made of a popular metal material of the iron type, the low speed roller 18 is made of a material having a lighter weight and a predetermined abrasion resistance such as a ceramic material.

By the way, the valve clearances between the main rocker arm 14 and the valves 2 and 3, that is, the valve clearances between the main rocker arm 14 and the valves 2 and 3 when the main rocker arm 14 is operated by the low speed cam 12 while the sub-rocker arm 15 is in the non-interlocking mode, are automatically adjusted by the hydraulic lash adjusters 81. However, since the valve clearances when the main rocker arm 14 moves integrally with the sub-rocker arm 15 while the sub-rocker arm 15 is in the interlocking mode are different from those while the sub-rocker arm 15 is in the non-interlocking mode, it is desired to allow the valve clearances in the interlocking mode of the sub-rocker arm 15 (that is, during high speed operation) to be adjusted by some means. It is to be noted that adjustment of the valve clearance here principally is initial adjustment upon assembly of the valve operating system.

Therefore, in the present valve operating system structure, a plurality of rollers having different outer diameters are prepared for the high speed roller 19, and one of the rollers having a suitable diameter is selected and assembled as the high speed roller 19 to the sub-rocker arm 15 as shown in FIG. 8 so that the valve clearances of the main rocker arm 14 may have suitable values when the sub-rocker arm 15 is in the interlocking mode.

Figure 24:
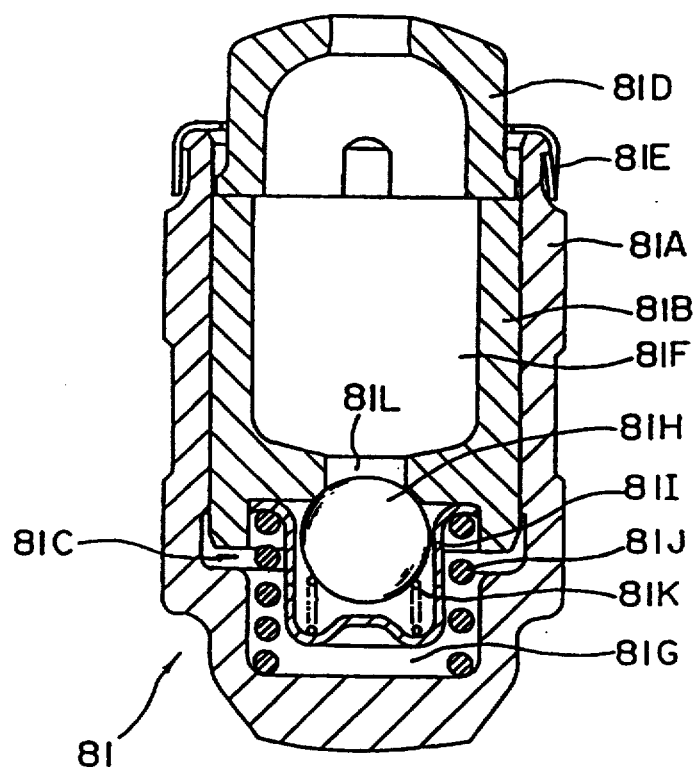
FIG. 24 is a schematic vertical sectional view showing a hydraulic lash adjuster in the internal combustion engine for a vehicle shown FIGS. 1(A) and 1(B)

Referring to FIG. 24, each of the hydraulic lash adjusters 81 includes a plunger 81B built in a body 81A thereof. A high pressure chamber 81G is defined between the plunger 81B and the body 81A, and a spring 81J is interposed in the high pressure chamber 81G and biases the plunger 81b in a direction (upward direction in FIG. 24) to move it away from the body 81A.

A plunger cap 81D is disposed in contact with an end of the plunger 81b such that the length of the axis of the hydraulic lash adjuster 81 from the lower end of the body 81A to the end of the plunger 81D may be increased by the biasing force of the spring 81J. It is to be noted that the plunger cap 81D is retained on a plunger cap retainer 81E so that it cannot be removed from the body 81A.

A reservoir chamber 81F is formed in the inside of the plunger 81B, and operating oil serving as operating fluid is supplied into the reservoir chamber 81F by way of an oil passage or operating liquid supply passage not shown. A hole 81L is perforated in the bottom wall of the reservoir chamber 81F, that is, the lower or base end of the plunger 81B, and communicates with the high pressure chamber 81G.

A check valve mechanism 81C is provided for closing the hole 81L. The check valve mechanism 81C includes a check valve retainer 81I and a check valve ball 81H accommodated in the check valve retainer 81I. The check valve ball 81H is biased by a check valve spring 81K into contact with the edge of the hole 81L to close the hole 81L.

In the check valve mechanism 81C, when operating oil is supplied into the reservoir chamber 81F to raise the internal pressure, the check valve ball 81H is moved against the check valve spring 81K to open the hole 81L so that the operating oil is supplied into the high pressure chamber 81G. Accordingly, when the length of the axis of the hydraulic lash adjuster 81 is increased by the biasing force of the spring 81J, the pressure of the operating oil in the reservoir chamber 81F rises so that the operating oil is supplied into the high pressure chamber 81G by way of the check valve mechanism 81C to maintain the oil pressure in the high pressure chamber 81G.

The hydraulic lash adjuster 81 of such a construction as described above is disposed on one of a pair of members for which the clearance between them is to be adjusted such that either the body 81A side is implanted fixedly while the plunger cap 81D side is set movable or the plunger cap 81D side is implanted fixedly while the body 81A side is set movable, and either an end portion of the plunger cap 81D or a base end portion of the body 81A which is a movable member is contacted with the other member.

Referring to FIG. 8, in the valve operating system in the present embodiment, the hydraulic lash adjuster 81 is installed such that the plunger cap 81D side thereof is fixedly implanted in the hydraulic lash adjuster mounting hole 14B or 14C of the main rocker arm 14 while the body 81A side thereof is left movable. In short, the two hydraulic lash adjusters 81 are mounted in the mounting holes 14B and 14C such that portions adjacent the bodies 81A thereof partially project downwardly.

Accordingly, if the clearances between the main rocker arm 14 and the valves 2 and 3 are increased, then the bodies 81A of the hydraulic lash adjusters 81 are partially projected outwardly by the biasing forces of the springs 81J to adjust the clearances between the main rocker arm 14 and the valves 2 and 3 while increasing the lengths of the axes of the hydraulic lash adjusters 81.

In this instance, the oil pressure in the high pressure chamber 81G of each hydraulic lash adjuster 81 is maintained by way of the check valve mechanism 81C. and also after adjustment of the clearance, the ends of the stems 6 of the valves 2 and 3 and the main rocker arm 14 are kept in a predetermined pressing condition between them so that the valve clearances are maintained stably.

Figure 15:
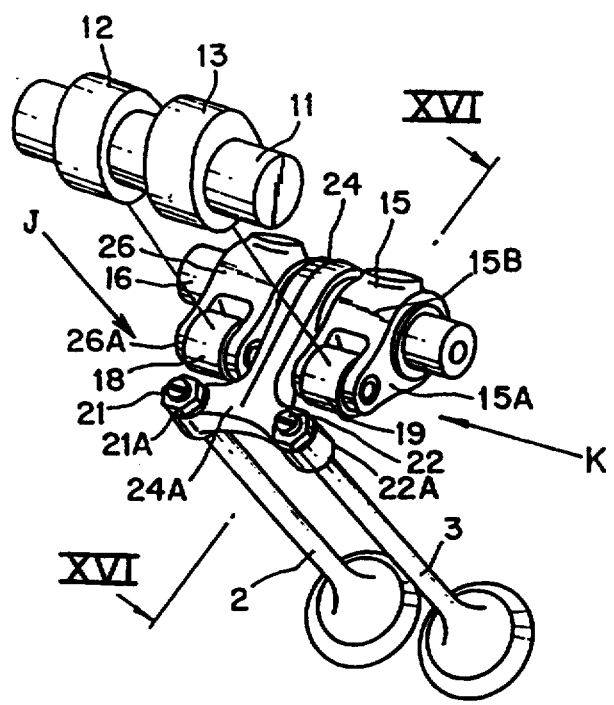
FIG. 15 is a schematic perspective view of another valve operating system structure with a variable valve timing mechanism provided with a variable displacement mechanism in the internal combustion engine for a vehicle shown in FIGS. 1(A) and 1(B) with cams shown spaced away from rocker arms.

Subsequently, the valve operating system Structures 9 with a variable valve timing mechanism provided with a variable displacement mechanism will be described. In the present embodiment, each of the valve operating systems 9 is provided for two pairs of intake valves and exhaust valves (hereinafter referred to merely as valves) as shown in FIG. 15 and is constructed so as to operate the valves 2 and 3 to open and close.

The valve operating system 9 is a modification to the valve operating system 10 described above in that it additionally has a variable displacement function, and includes a pair of cams 12 and 13 which rotate in response to rotation of the crankshaft of the engine 8, and a pair of rocker arms 26 and 15 which are operated by the cams 12 and 13, respectively. The rocker arms 26 and 15 serve as sub-rocker arms which do not contact directly with the valves 2 and 3 but indirectly contribute to opening and closing operation of the valves 2 and 3, respectively. The valve operating system 9 further includes, in addition to the sub rocker arms 26 and 15, a main rocker arm 24 which contacts with ends of the stems of the valves 2 and 3 to directly contribute to opening and closing operation of the valves 2 and 3.

The cams 12 and 13 are provided, similarly to those of the valve operating system 10 described above, on another camshaft 11 which rotates in response to the crankshaft of the engine 8. The cam 12 serves as a low speed cam having a cam profile for a valve timing upon low speed rotation of the engine 8 while the cam 13 serves as a high speed cam having another cam profile for another valve timing upon high speed rotation of the engine 8.

Figure 16:
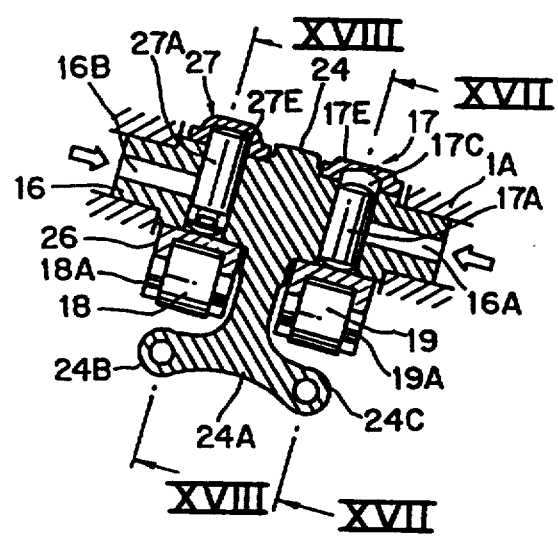
FIG. 16 is a sectional view taken along line XVI—XVI of FIG. 15.
Figure 21:
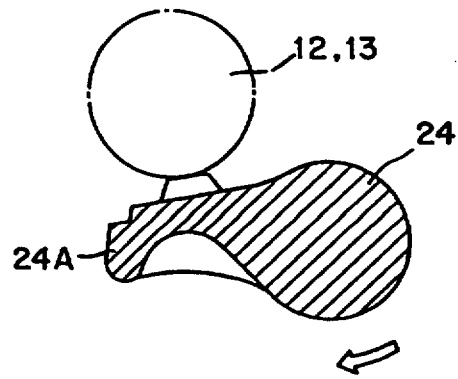
FIG. 21 is a sectional view taken along line XXI—XXI of FIG. 19.

Referring to FIGS. 16 and 21, the main rocker arm 24 is provided integrally with another cocker shaft 16. The rocker shaft 16 is disposed in parallel to the axis of the cam shaft 11 between the cam holder 23 provided at the top of the cylinder head 1 and the cam cap 25 provided so as to cover over the cam holder 23 as shown in FIG. 3. The rocker shaft 16 is supported for rotation on another bearing portion 1A provided on the cylinder head 1 of the like of the engine 8, and the main rocker arm 24 can be pivoted around the axis of the rocker shaft 16.

The main rocker arm 24 has a pair of screw mounting portions 24B and 24C provided at a rocking end portion 24A thereof, and a pair of adjust screws 21 and 22 are screwed on the screw mounting portions 24B and 24C for contacting with the ends of the stems of the valves 2 and 3.

Each of the sub-rocker arms 26 and 15 is in the form of a rocker arm with a roller, and the sub-rocker arm 26 is supported at a tubular base portion 26B thereof for pivotal motion with respect to the rocker shaft 16 and hence the main rocker arm 24 as seen in FIG. 16. A low speed roller 18 is provided at a rocking end portion 26A of the sub-rocker arm 26 for contacting with the low speed cam 12 as shown in FIGS. 15, 16, 18 and 19. The low speed roller 18 is supported for smooth rotation by way of a roller bearing 18B on a shaft 18A supported for rotation at the rocking end portion 26A.

Meanwhile, the sub-rocker arm 15 is constructed in a similar manner as that of the valve operating system 9 described above and is supported at a tubular base portion 15B thereof for pivotal motion with respect to the rocker shaft 16 and hence to the main rocker arm 24. The sub-rocker arm 15 has a high speed roller 19 provided at a rocking end portion 15A thereof for contacting with the high speed cam 13. Also the high speed roller 19 is supported for smooth rotation by means of a roller bearing 19B on a shaft 19A supported for rotation at the rocking end portion 15A of the sub-rocker arm 15 as shown in FIGS. 15 to 17, 19 and 20.

A pair of hydraulic piston mechanisms 27 and 17 are provided between the sub-rocker arms 26 and 15 and the rocker shaft 16 and serve as mode change-over means for changing over the operation modes of the sub-rocker arms 26 and 15 between a non-interlocking mode in which the sub rocker arms 26 and 15 are pivotable with respect to the rocker shaft 16 and do not operate in an interlocking relationship with the main rocker arm 24 and another interlocking mode in which the sub-rocker arms 26 and 15 pivot integrally with the rocker shaft 16 and operate in an interlocking relationship with the main rocker arm 24, respectively.

The hydraulic piston mechanism 17 provided for the sub-rocker arm 15 is constructed substantially similarly to that in the valve operating mechanism 9 described above. In particular, referring to FIGS. 16 and 17, the hydraulic piston mechanism 17 includes a piston 17A disposed for movement in a diametrical direction of the rocker shaft 16 in a piston chamber formed in the rocker shaft 16. The piston 17A has a recess 17F formed at an axial portion adjacent a lower or base end side thereof in FIGS. 16 and 17, and a hydraulic chamber 17G is defined between the recess of the piston 17A and an inner circumferential face of the tubular base portion 15B of the sub-rocker arm 15.

A flange portion 17H is formed on an outer periphery of the base end of the piston 17A while a stepped portion 17I is formed on the inner wall of the piston chamber, and a coil spring 17B is fitted in a compressed condition between the flange portion 17H and the stepped portion 17I. Accordingly, the piston 17A is normally biased toward the base end portion thereof by the Spring 17B.

Figure 17:
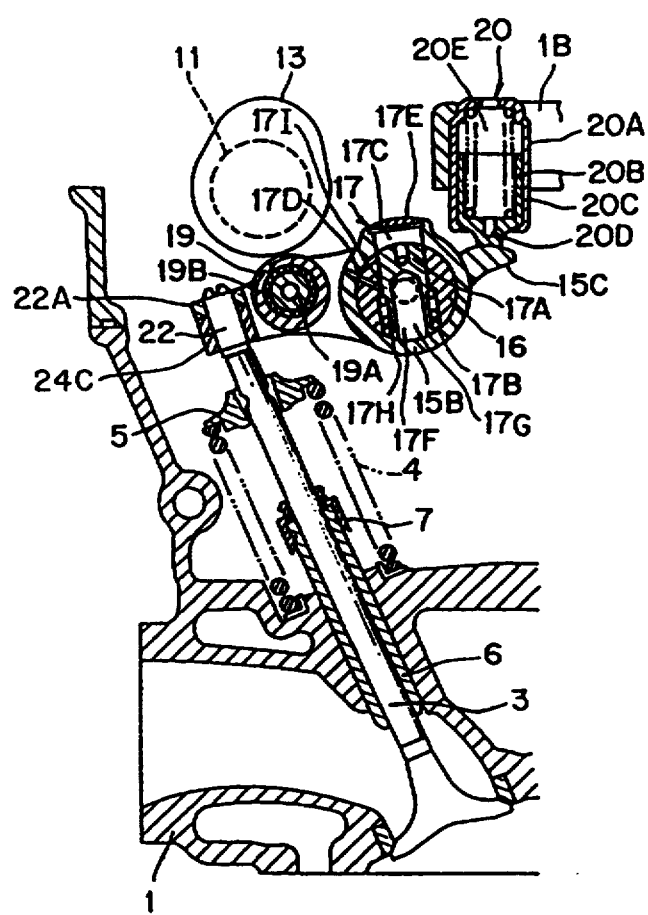
FIG. 17 is a sectional view taken along line XVII—XVII of FIG. 16 showing the valve operating system structure with a variable valve timing mechanism mounted on the engine.

A hole 17C is formed at a portion of the tubular base portion 15B of the sub-rocker arm 15 such that the other end of the piston 17A, that is, the upper end in FIGS. 16 and 17, can be fitted into it.

Figure 22:
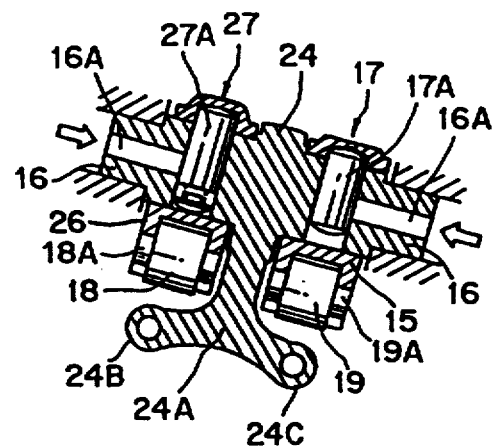
FIG. 22 is a sectional view similar to FIG. 16 but illustrating operation of the valve operating system structure with a variable valve timing mechanism.

Operating oil is introduced into the hydraulic chamber 17G by way of an oil passage 16A formed in the rocker shaft 16 along the axis. When operating oil is supplied into the hydraulic chamber 17G, the piston is operated toward its upper end side in FIGS. 16 and 17 against the biasing force of the spring 17B so that the end portion thereof is fitted into the hole 17C as seen in FIG. 22. Meanwhile, if supply of operating oil into the hydraulic chamber 17G is interrupted, then the piston 17A is moved reversely toward its base end side by the biasing force of the spring 17B so that the upper end thereof in FIG. 16 is removed from within the hole 17C.

In short, when operating oil is supplied into the hydraulic chamber 17G, the upper end portion of the piston 17A in FIG. 22 is fitted into the hole 17C to put the sub-rocker arm 15 into the interlocking mode in which the sub-rocker arm 15 pivots integrally with the rocker shaft 16 and operates in an interlocking relationship with the main rocker arm 24, but when supply of operating oil into the hydraulic chamber 17G is interrupted, the upper end portion of the piston 17A in FIG. 16 is removed from the hole 17C to put the sub-rocker arm 15 into the non-interlocking mode in which the sub-rocker arm 15 is pivotable relative to the rocker shaft 16 and does not operate in an interlocking relationship with the main rocker arm 24.

A check ball 17J is located in the interior of the recess 17F so that the oil pressure in the hydraulic chamber 17G may be maintained. Meanwhile, an oil hole 17D is formed in the rocker shaft 16 and-the tubular base portion 15B of the sub-rocker arm 15 for allowing part of operating oil in the hydraulic chamber 17G to leak to the outside to adjust the pressure of the operating oil within a predetermined range.

Figure 18:
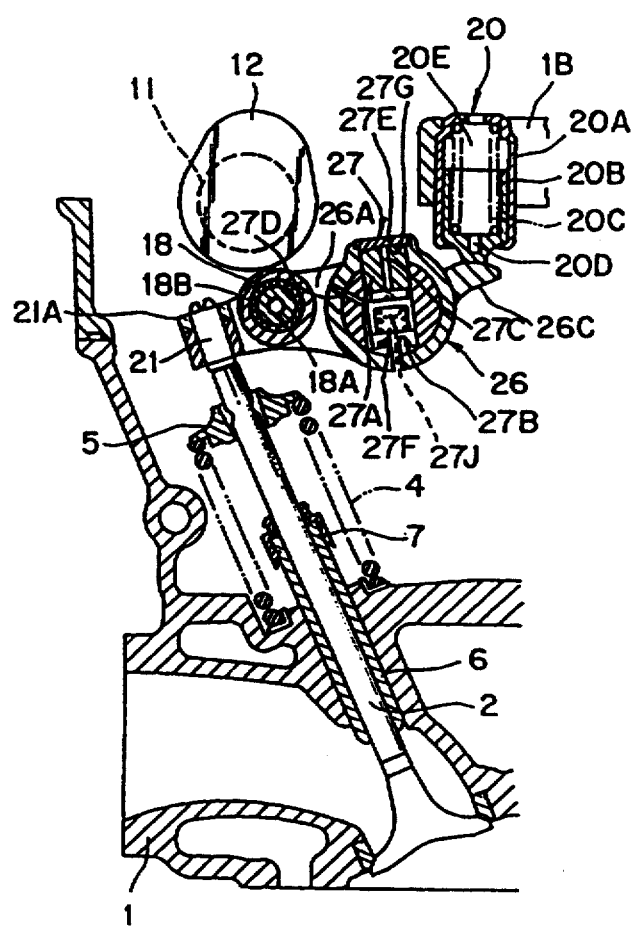
FIG. 18 is a sectional view taken along line XVIII—XVIII of FIG. 16 showing the valve operating system structure with a variable valve timing mechanism mounted on the engine.
Figure 19:
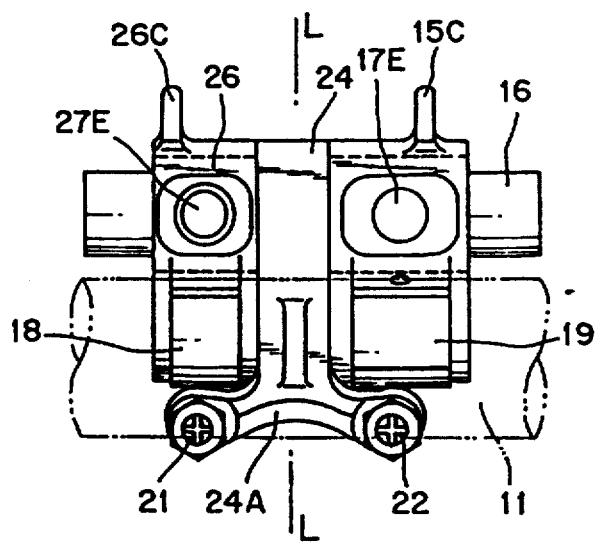
FIG. 19 is a top plan view as viewed in the direction indicated by an arrow mark J in FIG. 15 of rocker arms of the valve operating system structure with a variable valve timing mechanism.
Figure 20:
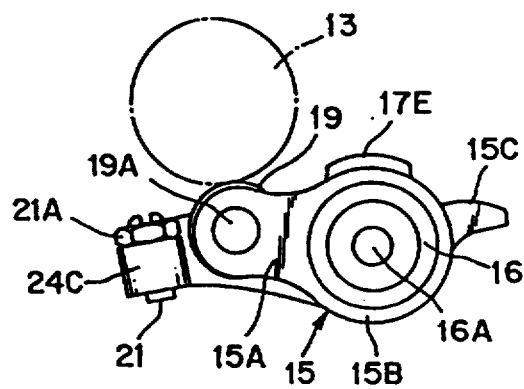
FIG. 20 is a side elevational view as viewed in the direction indicated by another arrow mark K in FIG. 15 of a rocker arm of the valve operating system structure with a variable valve timing mechanism.

Meanwhile, referring to FIGS. 16 and 18, the hydraulic piston mechanism 27 provided for the sub-rocker arm 26 includes a piston 27A disposed for movement in a diametrical direction of the rocker shaft 16 in another piston chamber formed in the rocker shaft 16. A recess 27F is formed in an axial portion of a lower end in FIGS. 16 and 18, that is, a base end, of the piston 27A, and a coil spring 27B is fitted in a compressed condition between the recess 28F and an inner peripheral face of the tubular base portion 26B of the sub-rocker arm 26. Accordingly, the piston 27A is normally biased toward the other or upper end portion thereof in FIGS. 16 and 18 by the spring 27B.

A hole 27C is formed in the wall of the tubular base portion 26B of the sub-rocker arm 26 adjacent the upper end in FIGS. 16 and 18 of the piston 27A, and a hydraulic chamber 27G is defined between the inner wall of the hole 27C and the upper end in FIGS. 16 and 18 of the piston 27A.

Operating oil is introduced into the hydraulic chamber 27G by way of the oil passage 16A formed in a portion of the rocker shaft 16 along the axis. When operating oil is supplied into the hydraulic chamber 27G, the piston 27A is operated toward its base or lower end side in FIGS. 16 and 18 against the biasing force of the spring 27B so that the upper end portion thereof in FIG. 22 is moved away from the hole 27C. On the other hand, if supply of operating oil into the hydraulic chamber 27G is interrupted, then the piston 27A is moved reversely toward its upper end side in FIG. 16 by the biasing force of the spring 27B so that the upper end thereof is fitted into the hole 27C.

In short, when operating oil is supplied into the hydraulic chamber 27G, the upper end portion of the piston 27A in FIG. 16 is removed from the hole 27C to put the sub-rocker arm 26 into the non-interlocking mode in which the sub-rocker arm 26 is pivotable relative to the rocker shaft 16 and does not operate in an interlocking relationship with the main rocker arm 24, but when supply of operating oil into the hydraulic chamber 27G is interrupted, the upper end portion of the piston 27A in FIG. 22 is fitted into the hole 27C to put the sub-rocker arm 26 into the interlocking mode in which the sub-rocker arm 26 rotates integrally with the rocker shaft 16 and operates in an interlocking relationship with the main rocker arm 24.

A check ball 27J is located at the interior of the recess 27F so that the oil pressure in the hydraulic chamber 27G may be maintained. Meanwhile, another oil hole 27D is formed in the rocker shaft 16 and the tubular base portion 26B of the sub-rocker arm 26 for allowing part of operating oil in the hydraulic chamber 27G to leak to the outside to adjust the pressure of the operating oil within a predetermined range.

Operating oil is supplied into the hydraulic chamber 17G by means of an operating oil supply system (not shown similarly to) supply of operating oil to the hydraulic chamber 17G of each cylinder which does not include a variable displacement mechanism. The operating oil supply system includes an engine pump, pressure regulating means for regulating operating oil pressurized by the engine pump to a predetermined hydraulic pressure, and a cut-off poppet valve or control valve 31. The cut-off poppet valve 31 can change over between a supplying condition wherein operating oil of a pressure regulated by the pressure regulating means is supplied into the hydraulic chamber 17G by way of the oil passage 16A and a non-supplying condition wherein the operating oil is not supplied into the hydraulic chamber 17G. In the arrangement shown, the cut-off poppet valve 31 is constituted from a solenoid valve which can be electronically controlled by means of a controller 34 which will be hereinafter described. The sub-rocker arm 15 can thus be changed over appropriately between the interlocking mode and the non-interlocking mode while the cut-off popper valve 31 is controlled in response to the speed of rotation of the engine or some other parameter.

Figure 25:
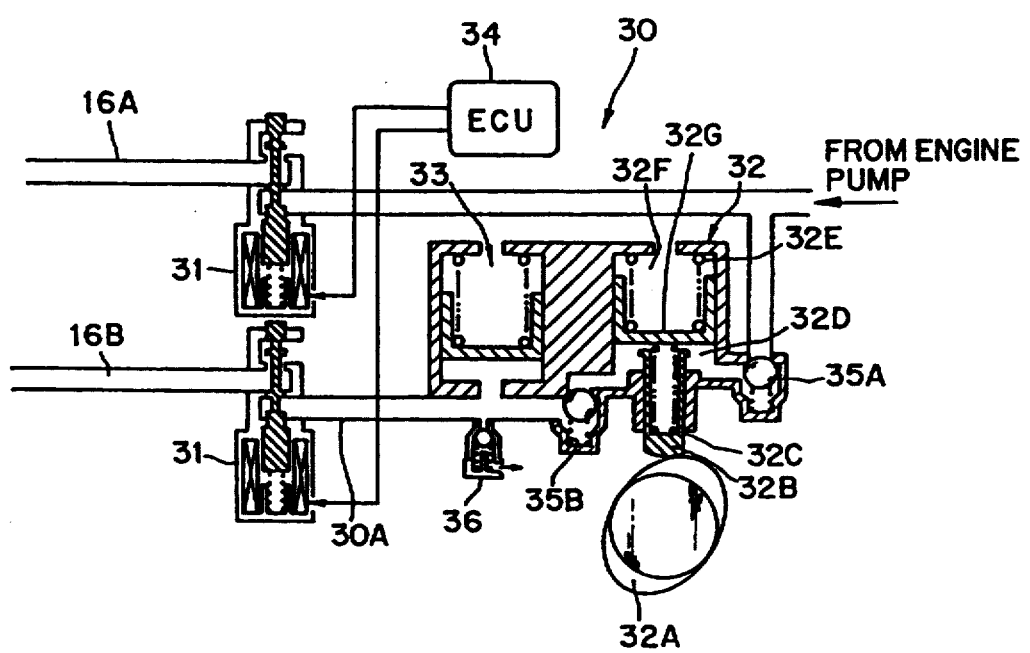
FIG. 25 is a schematic circuit diagram showing a hydraulic circuit of the valve operating systems of the internal combustion engine for a vehicle shown in FIGS. 1(A) and 1(B)
Figure 26A:
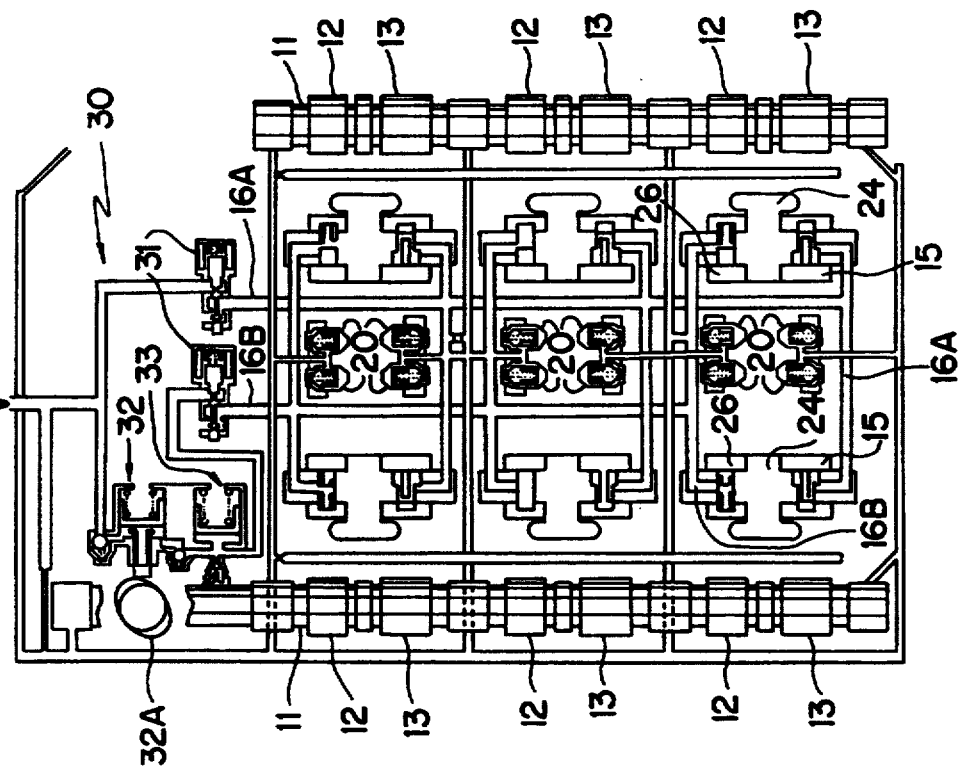

By the way, while operating oil flows into the oil passage 16A by way of a hydraulic passageway only including the cut-off poppet valve 31 as seen from FIGS. 25 and 26(A), operating oil is supplied into the other oil passage 16B by way of a hydraulic assist circuit 30.

This is because the piston 27A of the hydraulic piston mechanism 27 is operated when the engine 8 operates at a comparatively low speed and in this instance the hydraulic pump described above may not provide a sufficient output power and a sufficient hydraulic pressure may not be assured. As a countermeasure to this, the operating oil supply system to the hydraulic chamber 27G of the hydraulic piston mechanism 27 is provided with such a hydraulic assist circuit 30 as shown in FIGS. 25 and 26(A) so that a sufficient hydraulic pressure of operating oil can be assured also when the engine 8 operates at a low speed.

Referring to FIGS. 25 and 26(A), the operating oil supply system 30 is interposed between an engine pump and pressure regulating means not shown and the cut-off popper valve 31 and includes an assist hydraulic pump 32 which is driven by an oil pump cam 32A and an accumulator 33 for reserving operating oil pressurized by the assist hydraulic pump 32. Operating oil of a pressure regulated by the accumulator 33 is supplied to the hydraulic chamber 27G by way of the oil passage 16B described above. The cut-off poppet valve 31 changes over operating oil between a supplying condition and a non-supplying condition similarly as described above. The cut-off poppet valve 31 is constituted from a solenoid valve and electronically controlled by a controller 34.

The hydraulic pump 32 includes a cylinder 32F formed intermediately of the oil passage 30A, and a piston 32G accommodated for back and forth movement in the cylinder 32F. A portion of the cylinder 32F which communicates with the oil passage 30A serves as an oil chamber 32D. The oil chamber 32D is partitioned from the oil passage 30A by a pair of one-way valves 35A and 35B.

The one-way valves 35A and 35B allow operating oil to move only in a direction from the engine pump not shown to the control valve 31. In particular, when the oil chamber 32D is expanded during back and forth movement of the piston 32G, the one-way valve 35A is opened while the other one-way valve 35B is closed so that operating oil from the engine pump is admitted into and stored in the oil chamber 32D. Then, when the oil chamber 32D is contracted, the one-way valve 35A is closed while the other one-way valve 35B is opened so that the operating oil in the oil chamber 32D is fed to the accumulator 33.

The piston 32G is on one hand biased by a return spring 32E in a direction to contract the oil chamber 32D and on the other hand prevented from expanding the oil chamber 32D by a driving piston 32B and a spring 32C. Consequently, when the oil pump cam 32A rotates, the driving piston 32B is moved back and forth to move the piston 32G by way of the driving piston 32B and the spring 32C.

It is to be noted that the accumulator 33 is provided with a relief valve 36 serving as pressure regulating means for suppressing the internal pressure of the accumulator 33 within a fixed range.

Accordingly, also when the engine 8 operates at a low speed, a sufficient hydraulic pressure of operating oil can be assured, and consequently, the sub-rocker arms 15 and 26 described above can be changed over appropriately between the interlocking mode and the non-interlocking mode while controlling the cut-off poppet valves 31 in response to the speed of rotation of the engine 8 or some other parameter.

Figure 27:
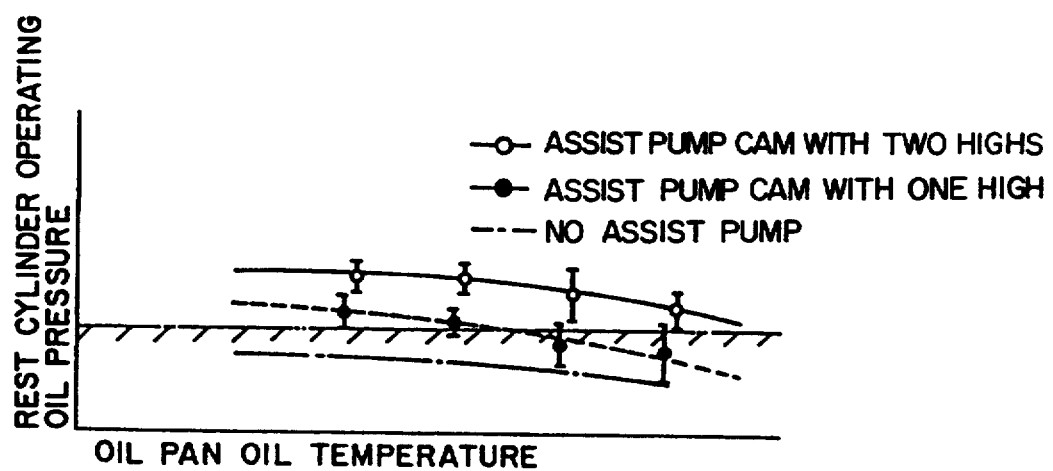
FIG. 27 is a diagram showing operating oil pressure characteristics of the valve operating mechanisms in the internal combustion engine for a vehicle shown in FIGS. 1(A) and 1(B)

It is to be noted that FIG. 27 illustrates a rise of a hydraulic pressure by the assist hydraulic pump 32 for different numbers of highs of the cam 32A, and the axis of abscissa represents the temperature of oil in an oil pan while the axis of ordinate represents a hydraulic pressure necessary for operation of a variable variation mechanism. As seen from FIG. 27, when the oil temperature rises, the output power of the assist hydraulic pump 32 drops due to a drop of the viscosity of the oil, and accordingly, in the arrangement of the present embodiment, a cam having two highs is employed as the oil pump cam 32A so that it can be used in a wide range of the oil temperature.

It is to be noted that, as shown in FIG. 17, a spring retainer 5 is provided adjacent an upper end of the valve stem 6 of the valve 3 while another spring retainer 7 is provided on the cylinder head 1, and a valve spring 4 is disposed between the two spring retainers 5 and 7 so that the valve 3 is normally biased in its closing direction, that is, toward the upper end side of the valve stem 6. Accordingly, also the main rocker arm 14 is normally biased toward the cam 12 side by the valve spring 4, and the biasing force of the valve spring 4 acts as a returning force for the main rocker arm 14 upon rocking motion.

In order for the sub-rocker arms 26 and 15 to follow up the cams 12 and 13, respectively, a pair of lost motion mechanisms 20 similar to those described above are provided. Particularly here, the lost motion mechanisms 20 for the sub-rocker arm 26 for a low speed and the sub-rocker arm 15 for a high speed are same as each other. This will be hereinafter described in detail.

By the way, the valve clearances between the main rocker arm 24 and the valves 2 and 3, that is, the valve clearances between the main rocker arm 24 and the valves 2 and 3 when the main rocker arm 24 is interlocked with and operated by the sub-rocker arm 26 for a low speed, can be adjusted by a pair of adjust screws 21 and 22. However, since the valve clearances when the main rocker arm 24 moves integrally with the sub-rocker arm 15 in the interlocking mode wherein the main rocker arm 24 operates in an interlocking relationship with the sub-rocker arm 15 for a high speed are still different from those in the non-interlocking mode wherein the main rocker arm 24 operates in an interlocking relationship with the sub-rocker arm 26 for a low speed.

Figure 12:
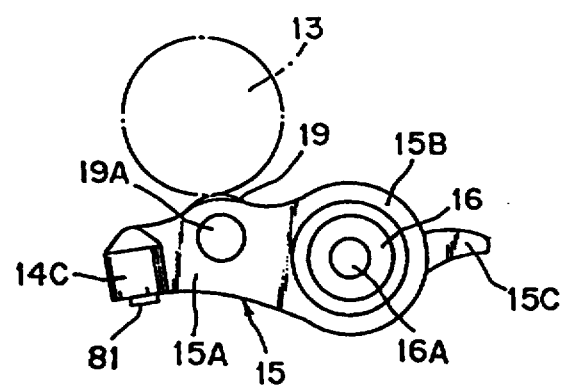
FIG. 12 is a side elevational view as viewed in the direction of an arrow mark D in FIG. 6(A) showing the rocker arm shown in FIG. 11.
Figure 13:
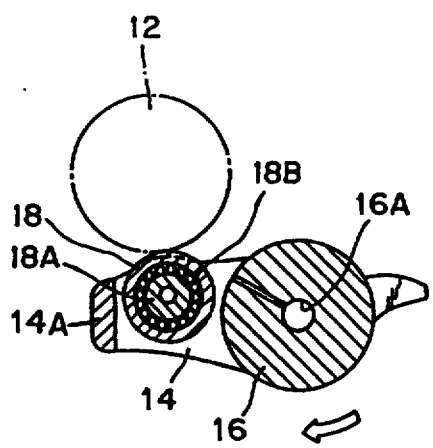
FIG. 13 is a sectional view taken along line XIII—XIII of FIG. 11.

Therefore, similarly as in the case of the main rocker arm 14 described above, a plurality of rollers having different outer diameters are prepared for the high speed roller 19, and one of the rollers having a suitable diameter is selected and assembled as the high speed roller 19 to the sub-rocker arm 15 as shown in FIG. 12 so that the valve clearances of the main rocker arm 24 may have suitable values when the sub-rocker arm 15 is in the interlocking mode.

Further, also in the present valve operating system 9, the low speed roller 18 is made of a material lighter in weight than that of the high speed roller 19. In short, while the high speed roller 19 is made of a popular metal material of the iron type, the low speed roller 18 is made of a material having a lighter weight and a predetermined abrasion resistance such as a ceramic material.

The valve operating system 9 with a variable valve timing mechanism including such a variable displacement mechanism as described above is provided for each of the cylinder of the left side cylinder bank 8A of the V-type engine 8.

By the way, the reason why the same lost motion mechanisms 20 are provided for the sub-rocker arm 26 for a low speed and the sub-rocker arm 15 for a high speed is described below.

In particular, while the lost motion mechanism 20 for the sub-rocker arm 26 for a low speed is required to exhibit its lost motion action in a high speed rotation range after the valve driving mode is changed over to a high speed driving mode, the inertial force acting upon the sub-rocker arm 26 for a low speed then increases in response to the speed and also increases from the cam profile of the low speed cam 12 which presents a small valve opening angle. Therefore, generally also the spring force of the lost motion spring 20C of the lost motion mechanism 20 must necessarily be set to a high level so as to cover the inertial force.

Figure 10:
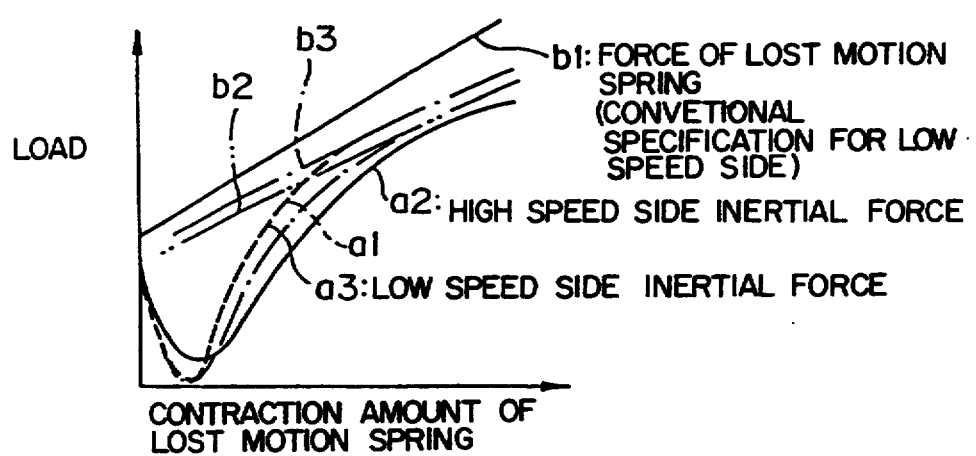
FIG. 10 is a diagram illustrating the inertia characteristic and the lost motion spring force characteristic of the variable valve timing mechanism shown in FIG. 7 with respect to the amount of contraction of a lost motion spring.
Figure 11:
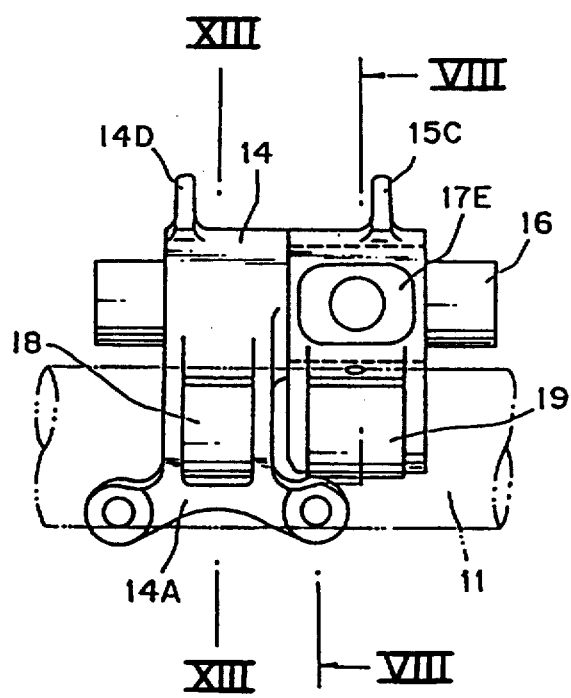
FIG. 11 is a top plan view as viewed in the direction of an arrow mark C in FIG. 6(A) of a rocker arm of the valve operating system structure with a variable valve timing mechanism.

In short, generally the inertial force of the sub-rocker arm 26 for a low speed (refer to the curve a1 in FIG. 10) is greater than the inertial force of the sub-rocker arm 15 for a high speed (refer to the curve a2 in FIG. 10), and also the minimum lost motion spring force required for a low speed (refer to the curve b1 in FIG. 10) is required to be greater than that required for a high speed (refer to the curve b2 in FIG. 10).

However, since the low speed roller 18 provided for the sub-rocker arm 26 is made of a material of a lighter weight than that of the high speed roller 19 provided for the sub-rocker arm 15 for a high speed, the weight of the sub-rocker arm 26 is reduced by the amount, resulting in reduction of the inertial force of the sub-rocker arm 26. In short, with the sub-rocker arm 26, the inertial force is reduced by an amount corresponding to the reduced weight of the low speed roller 18, and such an inertial force characteristic as represented by the curve a3 in FIG. 10 is obtained.

Accordingly, the minimum lost motion spring force required for the sub-rocker arm 26 for a low speed is changed to such as indicated by the straight line b3 in FIG. 10 and becomes lower than that of a conventional arrangement (refer to the straight line b1 in FIG. 10) and to such a degree as that for a high speed (refer to the straight line b2 in FIG. 10).

Consequently, even if a lost motion spring force of such a characteristic as indicated by the straight line b3 is set to the sub-rocker arm 15 for a high speed, the excess amount of the lost motion spring force acting upon the high speed side is a very small amount. Accordingly, even if the same lost motion mechanisms 20 are provided for the sub-rocker arm 26 for a low speed and the sub-rocker arm 15 for a high speed, no significant loss is resulted.

Rather, where the same lost motion mechanisms 20 are provided for both of the rocker arms 15 and 26, such advantages as reduction of the cost by common use of the part and prevention of an error in assembly of the lost motion mechanisms 20 can be anticipated.

Since the internal combustion engine for a vehicle of the first preferred embodiment of the present invention is constructed in such a manner as described above, it operates, for example, in the following manner.

First, when the engine 8 rotates at a low speed, the variable displacement mechanisms of the valve operating systems 9 in the front side cylinder bank 8A operate so that the cylinders of the cylinder bank 8A are at rest or inoperative, but in the rear side cylinder bank 8B, the valve operating systems 10 operate for a low speed.

In particular, when the engine 8 rotates at a low speed, in the front side cylinder bank 8A, the hydraulic piston mechanisms 17 of the hydraulic piston mechanisms 17 and 27 shown in FIG. 16 are put into a condition wherein operating oil is not supplied into the hydraulic chambers 17G and consequently the pistons 17A are removed from the holes 17C. Consequently, the sub-rocker arms 15 are put into the non-interlocking mode in which they are pivotable relative to the rocker shaft 16 and do not operate in an interlocking relationship with the respective main rocker arms 24. Meanwhile, in the other hydraulic piston mechanisms 27, operating oil is supplied into the hydraulic chambers 27F so that the pistons 27A are removed from the holes 27C. Consequently, the sub-rocker arms 26 are put into the non-interlocking mode in which they are pivotable relative to the rocker shaft 16 and do not operate in an interlocking relationship with the main rocker arms 24. Accordingly, the main rocker arms 24 are not operated, and consequently, the front side cylinder bank 8A exhibits a cylinder rest condition wherein the valves 2 and 3 are not operated to open or close.

In the meantime, in the near side cylinder bank 8B, operating oil is not supplied to the hydraulic piston mechanisms 17 shown in FIG. 7, and consequently, the pistons 17A are moved to their base end sides by the biasing forces of the springs 17B. Consequently, the pistons 17A are removed from the holes 17C so that the sub-rocker arms 15 are put into the non-interlocking mode in which they are pivotable relative to the rocker shaft 16 and do not operate in an interlocking relationship with the main rocker arms 14. Consequently, in the rear side cylinder bank 8B, the main rocker arms 14 are operated in accordance with the cam profiles of the cams 12 for a low speed, and the valves 2 and 3 are operated to open and close at valve timings for a low speed.

In this manner, when the engine 8 rotates at a low speed, the cylinders of the front side cylinder bank 8A are at rest while the cylinders of the rear side cylinder bank 8B are operated at valve timings for a low speed, and consequently, the fuel consumption is improved significantly.

Subsequently, when the engine 8 rotates at a medium speed, the valve operating systems 9 and 10 in both of the front and rear side cylinder banks 8A and 8B operate at valve timings for a low speed. In particular, when the engine 8 rotates at a medium speed, in the front side cylinder bank 8A, the hydraulic piston mechanisms 17 of the hydraulic piston mechanisms 17 and 27 are put into a condition wherein operating oil is not supplied into the hydraulic chambers 17G similarly as in the low speed operation of the engine 8 described above. Consequently, the sub-rocker arms 15 are put into the non-interlocking mode in which they are pivotable relative to the rocker shaft 16 and do not operate in an intelocking relationship with the respective main rocker arms 24. Meanwhile, in the other hydraulic piston mechanisms 27, operating oil is not supplied into the hydraulic chambers 27F either, and consequently, the pistons 27A are fitted into the holes 27C by the biasing forces of the return springs 27B. Consequently, the sub-rocker arms 26 are put into the interlocking mode in which they are integrated with the rocker shaft 16 and operate in an interlocking relationship with the main rocker arms 24. Accordingly, in the front side cylinder bank 8A, the sub-rocker arms 26 and the main rocker arms 24 are operated in an interlocking relationship with each other by the cam profiles of the low speed cams 12, and the valves 2 and 3 are operated to open and close at valve timings for a low speed.

In the meantime, in the rear side cylinder bank 8B, operating oil is not supplied to the hydraulic piston mechanisms 17 similarly as in the low speed operation of the engine, and consequently, the main rocker arms 14 are operated in accordance with the cam profiles of the cams 12 for a low speed, and the valves 2 and 3 are operated to open and close at valve timings for a low speed.

In this manner, when the engine 8 rotates at a medium speed, the valve operating systems 9 and 10 in both of the front and rear banks 8A and 8B are operated at valve timings for a low speed, and consequently, both of assurance of a sufficient output power and low fuel consumption can be attained.

On the other hand, when the engine 8 rotates at a high speed, the valve operating systems 9 and 10 in both of the front and rear side cylinder banks 8A and 8B operate at valve timings for a high speed. In particular, when the engine 8 rotates at a high speed, in the front side cylinder bank 8A, the hydraulic piston mechanisms 17 of the hydraulic piston mechanisms 17 and 27 are put into a condition wherein operating oil is supplied into the hydraulic chambers 17G so that the pistons 17A are fitted into the holes 17C. Consequently, the sub-rocker arms 15 are put into the interlocking mode in which they are coupled to the rocker shaft 16 and operate in an interlocking relationship with the respective main rocker arms 24. Meanwhile, in the other hydraulic piston mechanisms 27, the sub-rocker arms 26 for a low speed are put into the non-interlocking mode in which they are pivotable relative to the rocker shaft 16 and do not operate in an interlocking relationship with the main rocker arms 24.

Accordingly, in the front side cylinder bank 8A, the sub-rocker arms 15 and the main rocker arms 24 are operated in an interlocking relationship with each other by the cam profiles of the high speed cams 13, and the valves 2 and 3 are operated to open and close at valve timings for a high speed.

In the meantime, also in the rear side cylinder bank 8B, operating oil is supplied into the hydraulic piston mechanisms 17 so that the pistons 17A are fitted into the holes 17C. Consequently, the sub-rocker arms 15 are put into the interlocking mode in which they are coupled to the rocker shaft 16 and operate in an interlocking relationship with the main rocker arms 14. Accordingly, also in the rear side cylinder bank 8B, the sub-rocker arms 15 and the main rocker arms 14 are operated in an interlocking relationship with each other in accordance with the cam profiles of the cams 13 for a high speed, and the valves 2 and 3 are operated to open and close at valve timings for a high speed.

In this manner, when the engine 8 rotates at a high speed, the valve operating systems 9 and 10 in both of the front and rear banks 8A and 8B are operated at valve timings for a high speed, and consequently, a higher output power can be obtained.

In this manner, in the arrangement of the present embodiment, the valve timings in the cylinder banks 8A and 8B can be varied in accordance with an operation condition of the engine 8, and consequently, a high output power and low fuel consumption can be achieved in accordance with the operation condition of the engine.

Further, when the engine 8 operates at a low speed, since the cylinders in the front side cylinder bank 8A are at rest and the cylinders in the rear side cylinder bank 8B operate at valve timings for a low speed, no exhaust gas is exhausted from the cylinders in the cylinder bank 8A and the temperature in the exhaust manifold 53 drops.

Meanwhile, on the rear cylinder bank 8B side, running wind and wind blown by the radiator cooling fan little come upon the exhaust manifold 54 and exhaust gas in the exhaust manifold 54 flows into the catalytic converter 51 while it remains in a high temperature condition, and consequently, the catalytic converter 51 is kept at a high temperature and maintains its purifying performance.

In short, a drop of the temperature of exhaust gas to flow into the catalytic converter 51 is suppressed by exhaust gas of a high temperature exhausted from the cylinders on the cylinder bank 8B side, and consequently, the exhaust gas is purified sufficiently without degrading the purifying efficiency of the catalytic converter 51.

In the meantime, when the engine 8 operates at a medium speed, since the cylinders in both of the front and rear cylinder banks 8A and 8B operate at valve timings for a low speed, exhaust gas discharged from the cylinders of the cylinder banks 8A and 8B flows into the catalytic converter 51 by way of the exhaust manifolds 53 and 54 while it remains in a high temperature condition. Consequently, the catalytic converter 51 is kept at a high temperature, and accordingly, the purifying performance of the catalytic converter 51 is maintained. In other words, exhaust gas is purified efficiently by the catalytic converter 51.

On the other hand, when the engine 8 operates at a high speed, exhaust gas exhausted from the cylinders of the cylinder banks 8A and 8B flows into the catalytic converter 51 by way of the exhaust manifolds 53 and 54 while it remains in a high temperature condition. Accordingly, similarly as in the medium speed operation of the engine 8, the catalytic converter 51 is kept at a high temperature, and consequently, the purifying performance of the catalytic converter 51 is maintained. In other words, exhaust gas is purified efficiently by the catalytic converter 51.

In this manner, with the internal combustion engine for a vehicle which includes a variable displacement mechanism according to the present invention, even some of the cylinders are at rest, since the other cylinders which are not at rest are little blown by running wind or wind caused by the radiator cooling fan, the temperature of exhaust gas is not dropped, and consequently, the purifying efficiency of the catalytic converter can be maintained.

As a result, purification of exhaust gas is performed sufficiently irrespective of an operation condition of the engine.

Further, while it likely occurs in the V-type engine 8 described above that the cylinder bank 8A including the variable displacement mechanisms is more complicated in structure than the cylinder bank 8B which includes no variable displacement mechanism and requires maintenance in a higher frequency, according to the embodiment described above, since the surge tank 37A is located above the cylinder bank 8B of the V-type engine 8 which does not include a variable displacement mechanism, the facility of maintenance of the valve operating systems 9 provided with the variable displacement mechanisms described above is maintained.

In particular, since such intake system part as the surge tank 37A is not located above the valve operating systems 9 provided with the variable displacement mechanisms, if the rocker cover 9A is removed from the cylinder head 1, the valve operating systems 9 can Be checked and maintained. Consequently, the facility of maintenance of the valve operating systems 9 provided with the variable displacement mechanisms is maintained high.

Further, since the surge tank 37A is provided in an overhanging condition above the cylinder Bank 8B provided with no variable displacement mechanism and the intake pipe 37B connected to the intake ports 37C of the cylinder banks 8A and 8B is bent in the rearward direction of the vehicle above the engine 8 and connected to the surge tank 37A, a sufficient length can be assured for the intake pipe 37B.

Further, also in the valve operating systems 10 provided with no variable displacement mechanism, the accuracy is required for the valve clearances particularly with the variable valve timing mechanisms. While part of the intake system 37 is disposed above the valve operating systems 10, the valve clearances are automatically adjusted by the hydraulic lash adjusters 81 incorporated in the main rocker arms 14 of the valve operating systems 10. Accordingly, in the valve operating systems 10, checking and maintenance regarding the valve clearances can be eliminated, and the influence of the intake system parts located above the valve operating systems 10 upon the facility of maintenance can be minimized.

Further, the cost and the man-hours for development of an engine can be reduced by using the hydraulic lash adjusters 81 only for the valve operating systems 10 and employing the adjust screws 21 and 22 of a comparatively low price for the valve operating systems 9 which are superior in facility of maintenance.

Further, since the intake pipe 37B connected to the intake ports 37C of the cylinder banks 8A and 8B is bent in the rearward direction of the vehicle above the engine 8 and connected to the surge tank 37A, a sufficient length can be assured for the intake pipe 37B.

Further, while the valve operating systems 9 and 10 which are different from each other are provided for the left side cylinder bank 8A and the right side cylinder bank 8B in the arrangement of the present embodiment, since the cylinders in each of the cylinder banks 8A and 8B include same valve operating systems, components of the valve operating systems 9 and 10 of the cylinder heads 1 can be made common among the cylinders of each cylinder bank 8A or 8B. Consequently, when the components of the valve operating system 9 or 10 are to be assembled to the cylinder head 1, there is no necessity of assembling different parts for different cylinders, and consequently, an error in assembly of parts can be prevented.

Particularly in an engine having a plurality of cylinder banks in such a manner as described above, when the engine 8 is to be assembled, the cylinder head 1 can be managed as an assembly for each cylinder bank. In particular, the variable valve timing mechanisms with a variable displacement mechanism are incorporated into the valve operating systems 9 of the cylinder head 1 of the left side cylinder bank 8A to form an assembly, and similarly, the variable valve timing mechanisms with no variable displacement mechanism are incorporated into the valve operating systems 10 of the cylinder head 1 of the rear side cylinder bank 8B to form another assembly, and then the two cylinder head assemblies are assembled to the cylinder block.

When each of the cylinder head assemblies is to be assembled, components of the valve operating systems 9 and 10 of the cylinder heads 1 can be set common among the cylinders in each of the cylinder banks 8A and 8B.

By assembling the cylinder heads 1 in the form of assemblies to the cylinder block in this manner, an assembling operation of the engine 8 having such a plurality of variable valve timing mechanisms 9 and 10 as described above is facilitated and the operability is enhanced. Further, also the stock control is facilitated by managing parts of the cylinder heads 1, in which the variable valve timing mechanisms 9 and 10 are incorporated, for the individual assemblies.

Further, also by locating the variable valve timing mechanisms 9 with a variable displacement mechanism, which are complicated in structure comparing with the variable valve timing mechanisms 10 with no variable displacement mechanism, in the cylinder bank (left side bank in FIG. 2) 8A on the front side of the vehicle, it becomes comparatively easy to maintain the cylinder bank 8A provided with the variable displacement mechanisms, and the facility of maintenance of the engine 8 after installation onto the vehicle can be improved.

It is to be noted that, while, in the first embodiment, the valve operating mechanisms are described including two types individually provided for two types of variable valve timing mechanisms including a variable valve timing mechanism with no variable displacement mechanism and another variable valve timing mechanism with a variable displacement mechanism, the valve operating mechanisms for an internal combustion engine of the present invention are not limited to those two types, and only it is required that the characteristics of the valve operating mechanisms are different for different cylinder banks of the engine while they are common in each cylinder bank.

Further, while, in the first embodiment, the hydraulic lash adjusters 81 are provided at the rocking end portions 14A of the main rocker arms 14 in the cylinder bank 8B to assure a high facility of maintenance, the adjust screws 21 and 22 for contacting with the ends of the stems 6 of the valves 2 and 3 may alternatively be screwed onto the mounting portions 14B and 14C provided at the rocking end portions 14A of the main rocker arms 14 in the cylinder bank 8B.

In a second embodiment of the present invention described below, an internal combustion engine for a vehicle includes some other combination than such a combination of a variable valve timing mechanism with no variable displacement mechanism and another variable valve timing mechanism with a variable displacement mechanism as described above.

Figure 28A:
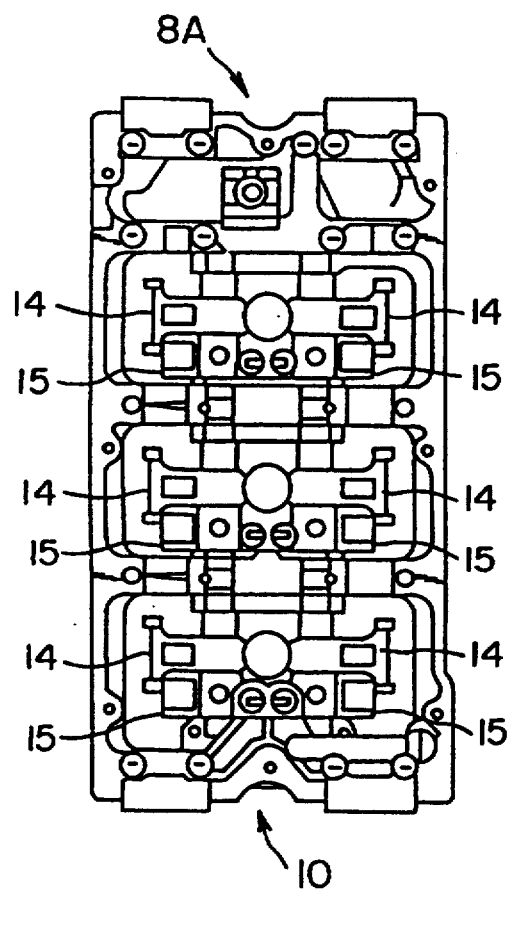
FIGS. 28(A) and 28(B) are schematic views showing another internal combustion engine for a vehicle according to a second preferred embodiment of the present invention.
Figure 28B:
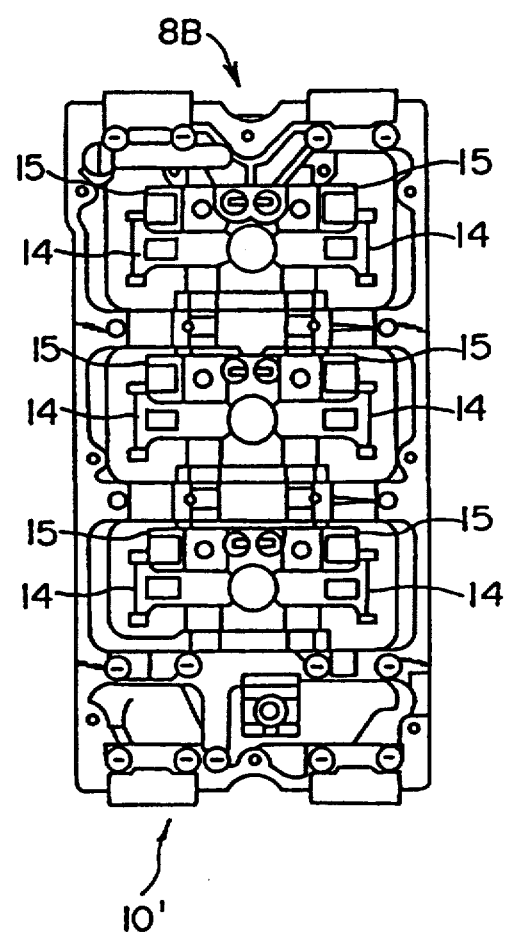

Referring to FIGS. 28(A) and 28(B), the internal combustion engine for a vehicle according to the second embodiment of the present invention is shown. The internal combustion engine shown is a modification to the internal combustion engine of the first embodiment described above, and description will be given only of differences of it from those of the internal combustion engine of the first embodiment. Also the internal combustion engine of the present embodiment is generally denoted at 8 and includes variable valve timing mechanisms 10 and 10' with no variable displacement mechanism provided in cylinder banks 8A and 8B, respectively. The variable valve timing mechanisms 10 and 10' have different characteristics from each other.

Each of the variable valve timing mechanisms 10' is constructed substantially in a similar manner as the variable valve timing mechanisms 10 with no variable displacement mechanism described above, and for example, the cam profile of a cam 12 for a low speed or another cam 13 for a high speed is different from that in the variable valve timing mechanisms 10. Consequently, the valves 2 and 3 are operated at different valve timings between the cylinder banks 8A and 8B.

Further, an intake pipe 37B (FIG. 2) is located in an overhanging condition above the variable valve timing mechanisms 10', and a pair of mounting holes 14B and 14C are formed at a rocking end portion 24A of a main rocker arm 14 of each of the variable valve timing mechanisms 10' and a pair of hydraulic lash adjusters 81 for contacting with ends of the stems of the valves 2 and 3 are mounted in the mounting holes 14B and 14C similarly as in the first embodiment described above.

Figure 29:
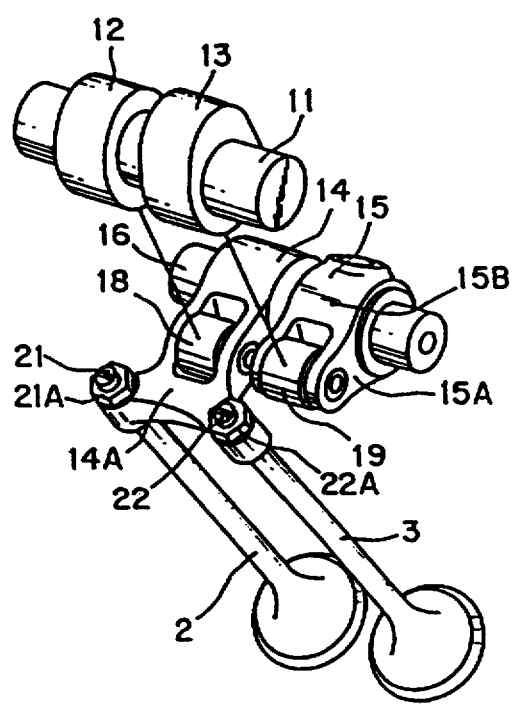
FIG. 29 is an exploded perspective view similar to FIG. 15 but showing a rocker arm of a valve operating system structure with a variable valve timing mechanism provided with no variable displacement mechanism in the internal combustion engine for a vehicle shown in FIGS. 28(A) and 28(B)

Meanwhile, referring also to FIG. 29, a pair of adjust screws 21 and 22 are provided as means for adjusting the valve clearances for a main rocker arm 24 of each of the variable valve timing mechanisms 10 above which the intake valve 37B is not located in an overhanging condition, similarly as in the first embodiment.

Since the internal combustion engine for a vehicle according to the second embodiment of the present invention is constructed in such a manner as described above, similar effects to those of the first embodiment can be obtained.

It is also possible to provide the variable valve timing mechanisms 10 with no variable displacement mechanism for one of the cylinder banks, for example, for the cylinder bank 8A and provide ordinary valve operating mechanisms, which provide fixed valve timings, for the other cylinder bank 8B. In this instance, when the engine 8 operates, for example, at a low speed, the valves 2 and 3 in the cylinder bank 8A are operated by the cams 12 for a low speed, but when the engine 8 operates at a high speed, the valves 2 and 3 are operated by the cams 13 for a high speed, but in the other cylinder bank 8B, the valves 2 and 3 are operated at fixed valve timings irrespective of an operation condition of the engine 8.

Similarly, the variable valve timing mechanisms 9 with a variable displacement mechanism may be provided for one of the cylinder banks, for example, for the cylinder bank 8A while ordinary valve operating mechanisms are provided for the other cylinder bank 8B. In this instance, the cylinders, for example, in the cylinder bank 8A are at rest when the engine 8 operates at a low speed, but when the engine 8 operates at a medium speed, the valves 2 and 3 are operated by the cams 12 for a low speed, and then when the engine 8 operates at a high sped, the valves 2 and 3 are operated by the cams 13 for a high speed. Meanwhile, in the other cylinder bank 8B, the valves 2 and 3 are operated at fixed valve timings irrespective of an operation condition of the engine 8.

It is otherwise possible to provide ordinary valve operating mechanisms for both of the cylinder banks 8A and 8B. In this instance, the valve operating mechanisms in the cylinder banks 8A and 8B are set different in characteristic. For example, the cam profiles are set different between the cylinder banks 8A and 8B so that the valves 2 and 3 may be operated at different valve timings between the cylinder banks 8A and 8B.

Figure 6B:
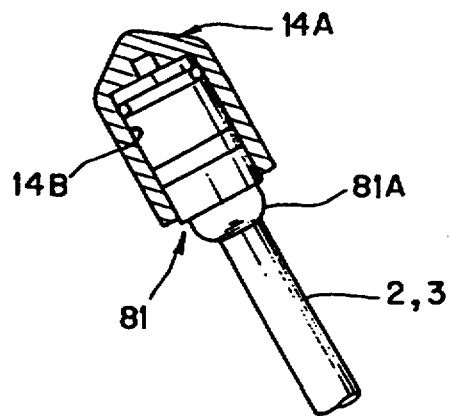
FIG. 6(B) is a sectional view taken along line VI(B)—VI(B) of FIG. 6 (A)
Figure 30:
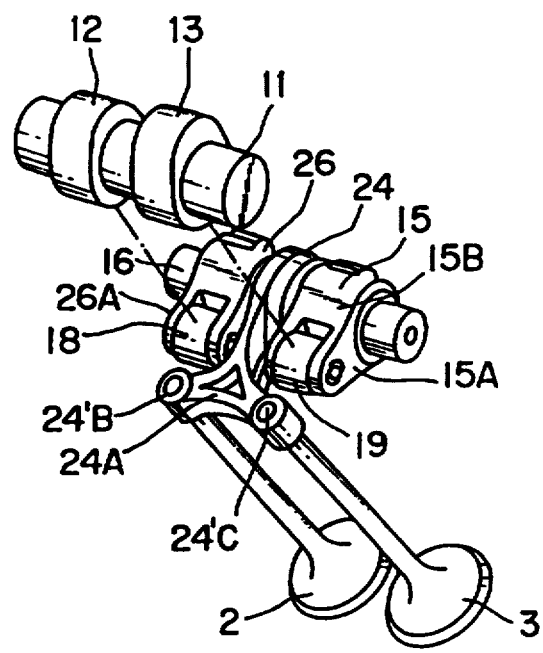
FIG. 30 is a perspective view corresponding to FIG. 6(A) but showing a modification to the internal combustion engine for a vehicle shown in FIGS. 28(A) and 28(B) with cams shown displaced away from rocker arms.
Figure 31:
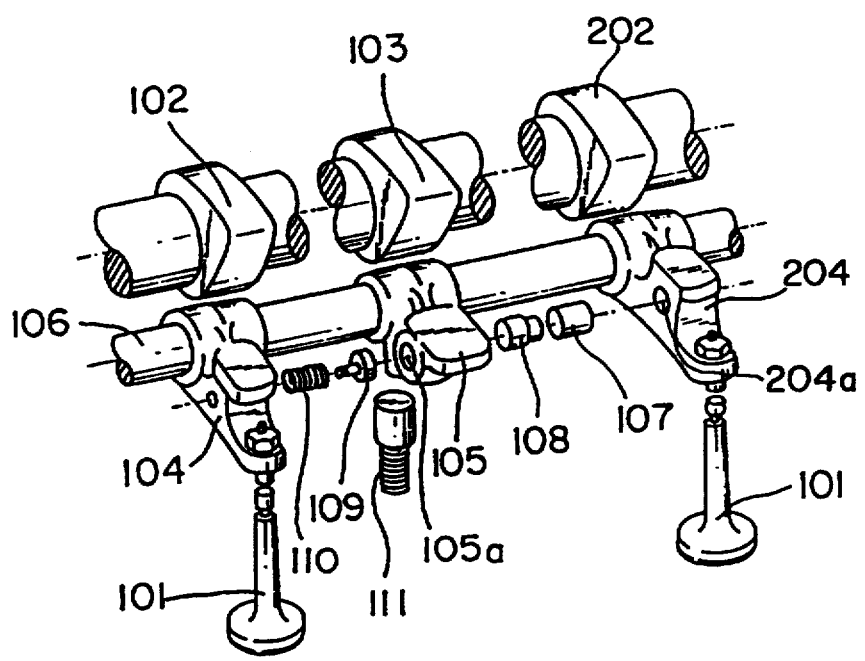
FIG. 31 is a schematic exploded perspective view showing a conventional valve operating system structure with a variable valve timing mechanism.
Figure 32:
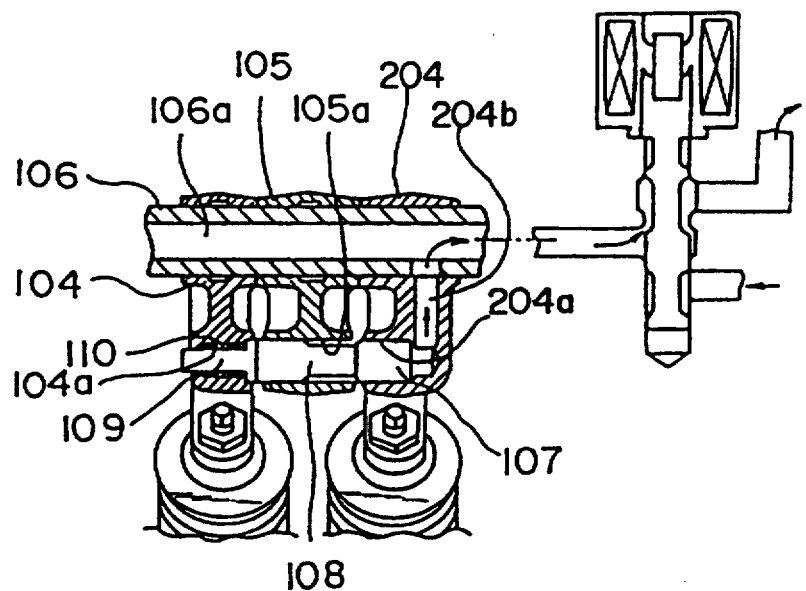
FIG. 32 is a schematic sectional view of part of the valve operating system structure with a variable valve timing mechanism of FIG. 31.
Figure 33:
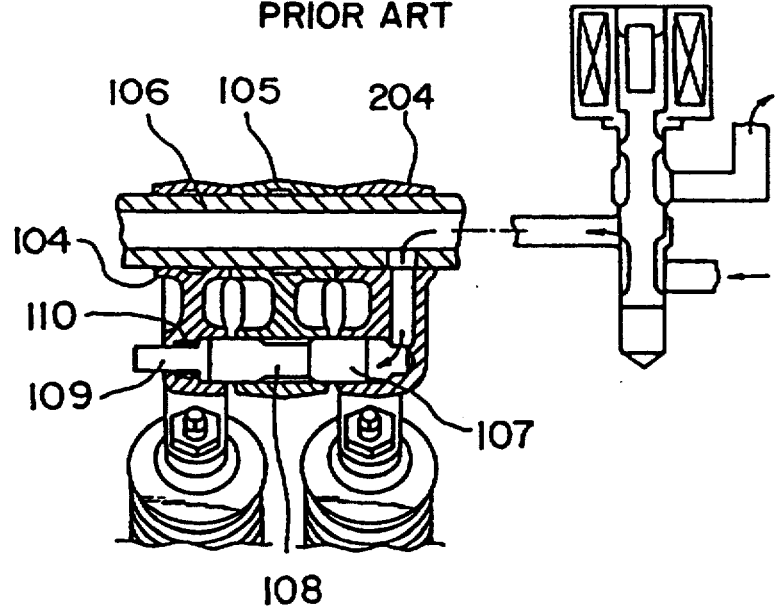
FIG. 33 is a similar view but illustrating operation of the valve operating system structure with a variable valve timing mechanism of FIG. 31.
Figure 34:
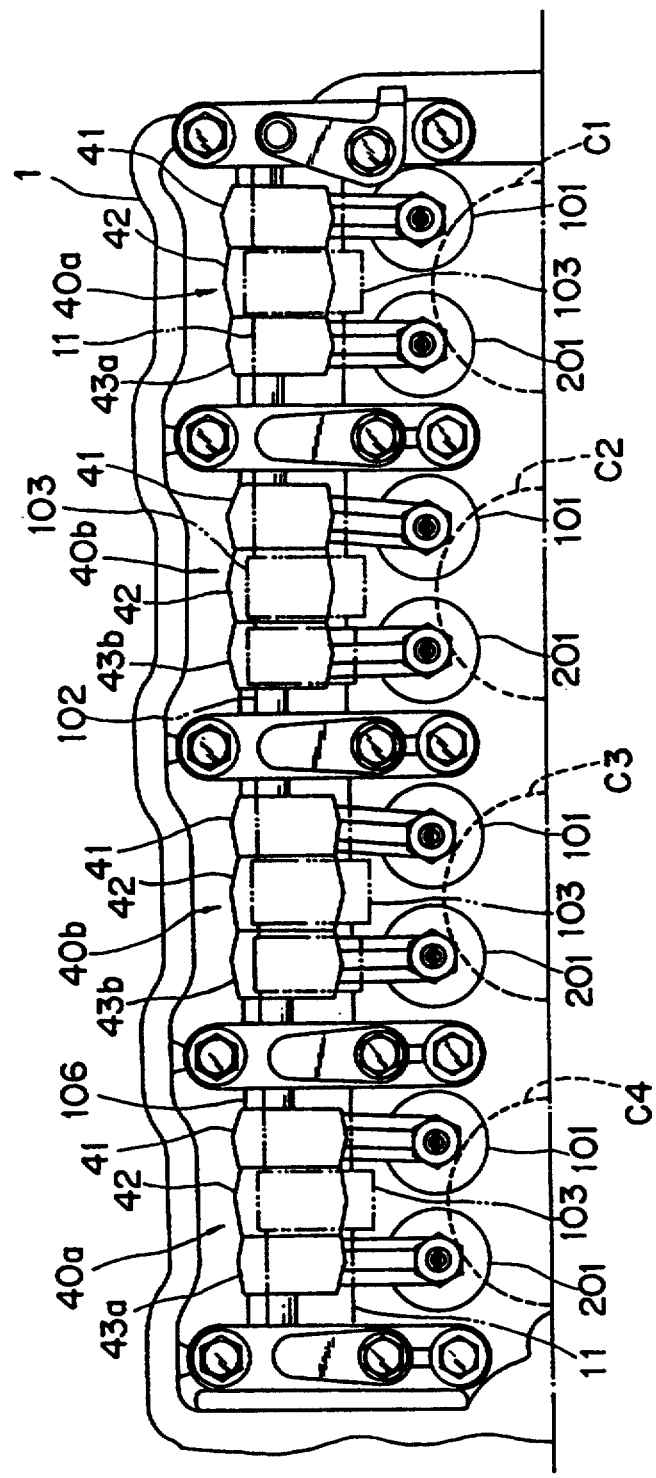
FIG. 34 is a schematic top plan view showing a conventional internal combustion engine employing a valve operating system structure with a variable valve timing mechanism.
Figure 35:
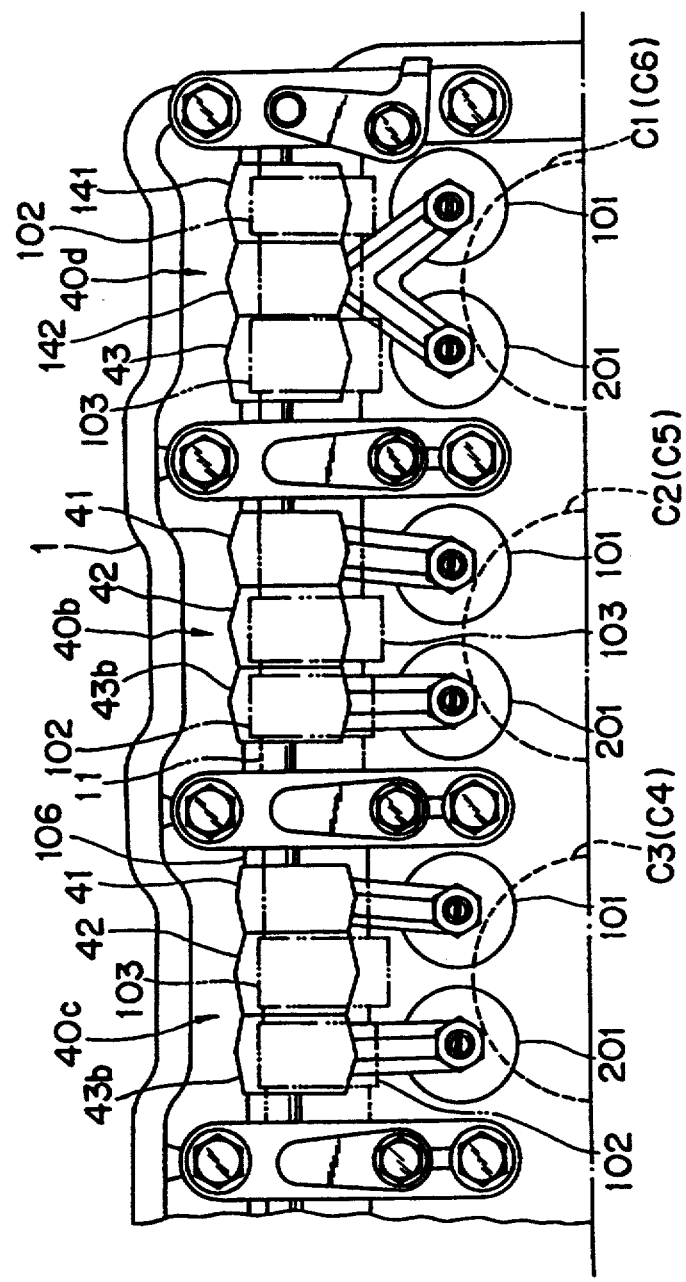
FIG. 35 is a similar view but showing another conventional internal combustion engine employing a valve operating system structure with a variable valve timing mechanism.
Figure 36:
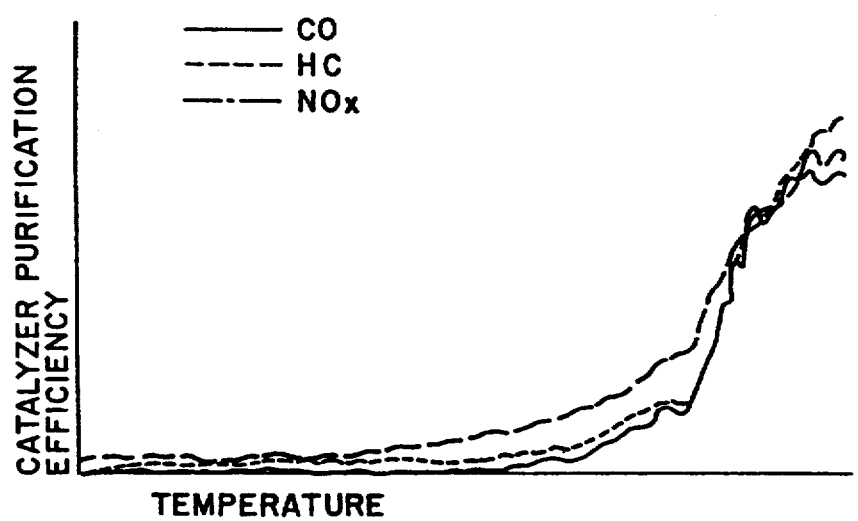
FIG. 36 is a characteristic diagram showing the relationship between the purifying efficiency of a conventional catalytic converter and the temperature of exhaust gas.

Further, it is possible to provide variable valve timing mechanisms with a variable displacement mechanism also for the cylinder bank 8B above which the intake pipe 37B is located in an overhanging condition. In this instance, a pair of hydraulic lash adjusters 81 are provided as valve clearance adjusting means on a main rocker arm 24 of each of the valve operating systems as shown in FIG. 30. It is to be noted that the cross section taken along line valve 2 of FIG. 30 is similar to that of FIG. 6(B).

The hydraulic lash adjusters 81 are installed in a pair of hydraulic lash adjuster mounting holes 24'B and 24'C of the main rocker arm 24 such that the plunger cap 81D sides thereof are fixedly implanted while the body 81A sides thereof are set movable similarly as in the first embodiment described above. In short, the hydraulic lash adjusters 81 are mounted in the mounting holes 24'B and 24'C such that they partially project downwardly from the body 81A sides thereof.

Consequently, also in this instance, adjustment of the valve clearances of the valve operating systems is unnecessary, and the facility of maintenance of the valve operating systems with a variable displacement mechanism is maintained.

Further, the valve operating mechanisms in the cylinder banks 8A and 8B in the present embodiment are not limited to those described above, and only it is required that the valve operating mechanisms in the cylinder banks 8A and 8B be different in characteristic from each other and the characteristics of the valve operating mechanisms be set common to the cylinders in each of the cylinder banks 8A and 8B.

Since the internal combustion engine for a vehicle according to the second embodiment of the present invention is constructed in such a manner as described above, components of the valve operating systems 10 and 10' of the cylinder heads 1 can be set common among the cylinders in each of the cylinder banks 8A and 8B, similarly as in the first embodiment. Consequently, when the components of the valve operating system 10 or 10' are to be incorporated into the cylinder head 1, it is not necessary to incorporate different parts for the cylinders in each of the cylinder banks 8A and 8B and consequently, an error in assembly of parts can be prevented.

Particularly in an engine having a plurality of cylinder banks in such a manner as described above, when the engine 8 is to be assembled, the cylinder head 1 can be managed as an assembly for each cylinder bank. In particular, by incorporating the cylinder heads 1 in the form of assemblies into the cylinder block, the assembling operation of the engine 8 having a plurality of valve operating mechanisms is facilitated and the operability is improved. Further, also the stock control is facilitated by managing parts of the cylinder heads 1, in which the variable valve timing mechanisms 10 and 10' are incorporated, for the individual assemblies.

It is to be noted that, while, in the present embodiment, description is given of an application of a V-type engine, the internal combustion engine for a vehicle according to the present invention can be applied not only to such a V-type engine but also widely to various engines which have at least two cylinder banks such as, for example, a horizontal opposed type engine or an engine having three or more cylinder banks.

Further, the internal combustion engine for a vehicle according to the present invention is not limited to an engine of the type wherein two intake valves and two exhaust valves are provided for each cylinder, but may be applied widely to various engines which include a single valve or three or more valves.

What is claimed is:

1. An internal combustion engine for a vehicle, comprising:
   a first cylinder bank and a second cylinder bank each including at least one cylinder;
   a first valve operating mechanism provided for each cylinder of said first cylinder bank for operating at least one of an intake valve and an exhaust valve of the cylinder to open and close, said first valve operating mechanism having a variable valve timing mechanism for changing opening and closing timing of the intake valve or the exhaust valve and a variable displacement mechanism for stopping operation of the intake valve or the exhaust valve; and a second valve operating mechanism provided for each cylinder of said second cylinder bank for operating at least one of an intake valve and an exhaust valve of the cylinder to open and close, said second valve operating mechanism being for normally driving the intake valve or the exhaust valve, said second valve operating mechanism having a variable valve timing mechanism for changing opening and closing timing of the intake valve or the exhaust valve, said second valve operating mechanism not having a variable displacement mechanism for stopping operation of the intake valve or the exhaust valve.

2. The internal combustion engine for a vehicle as claimed in claim 1, wherein said variable valve timing mechanism has a piston for performing connection or disconnection between a high-speed rocker arm and a valve operating member, and said variable valve timing mechanism with the variable displacement mechanism has a first piston for performing connection or disconnection between a high-speed rocker arm and a valve operating member and a second piston for performing connection or disconnection between a low-speed rocker arm and said valve operating member.

3. The internal combustion engine for a vehicle as claimed in claim 1, wherein said first and second cylinder banks are combined such that they are inclined relative to each other so as to construct said internal combustion engine as an internal combustion engine of the V-type arrangement.

4. The internal combustion engine for a vehicle as claimed in claim 1, wherein an intake system of said internal combustion engine is disposed in a partially overhanging condition above said second cylinder bank having said second valve operating mechanism in order to assure a required length for an intake passage of said intake system.

5. The internal combustion engine for a vehicle as claimed in claim 4, wherein said second valve operating system is provided with a hydraulic lash adjuster for automatically adjusting a valve clearance.

6. The internal combustion engine for a vehicle as claimed in claim 1, wherein said internal combustion engine is provided with a catalytic converter for purifying exhaust gas from said internal combustion engine and said first cylinder bank is disposed on an upstream side of cooling wind to which said internal combustion engine is exposed.

7. The internal combustion engine for a vehicle as claimed in claim 6, wherein said internal combustion engine is installed transversely on a front side of said vehicle such that each of said cylinder banks extends in a transverse direction of said vehicle and said first cylinder bank is located on the front side of said vehicle.

8. An internal combustion engine for a vehicle, comprising:

a first cylinder bank and a second cylinder bank each including at least one cylinder;

a first valve operating mechanism provided for each cylinder of said first cylinder bank for operating at least one of an intake valve and an exhaust valve of the cylinder to open and close, said first valve operating mechanism having a variable valve timing mechanism for changing opening and closing timing of the intake valve or the exhaust valve and a variable displacement mechanism for stopping operation of the intake valve or the exhaust valve; and a second valve operating mechanism provided for each cylinder of said second cylinder bank for operating at least one of an intake valve and an exhaust valve of the cylinder to open and close, said second valve operating mechanism being for normally driving the intake valve or the exhaust valve, said second valve operating mechanism consisting of a variable valve timing mechanism for changing opening and closing timing of the intake valve or the exhaust valve, said second valve operating mechanism not having a variable displacement mechanism for stopping operation of the intake valve or the exhaust valve.

9. The internal combustion engine for a vehicle as claimed in claim 8, wherein said variable valve timing mechanism has a piston for performing connection or disconnection between a high-speed rocker arm and a valve operating member, and said variable valve timing mechanism with the variable displacement mechanism has a first piston for performing connection or disconnection between a high-speed rocker arm and a valve operating member and a second piston for performing connection or disconnection between a low-speed rocker arm and said valve operating member.

* * * * *